United States Patent

Shiomi et al.

(10) Patent No.: US 7,024,668 B2
(45) Date of Patent: Apr. 4, 2006

(54) APPLICATION EXECUTION APPARATUS AND METHOD

(75) Inventors: Takakazu Shiomi, Hirakata (JP); Satoru Hayama, Kobe (JP); Takeshi Hiramoto, Minamishouwa-machi (JP); Yuko Kubooka, Hiroshima (JP); Shigenori Doi, Hiroshima (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 714 days.

(21) Appl. No.: 09/854,268

(22) Filed: May 11, 2001

(65) Prior Publication Data

US 2002/0049719 A1   Apr. 25, 2002

(30) Foreign Application Priority Data

| May 15, 2000 | (JP) | ............................. 2000-141492 |
| May 15, 2000 | (JP) | ............................. 2000-141493 |
| Dec. 27, 2000 | (JP) | ............................. 2000-398746 |

(51) Int. Cl.
 G06F 9/455  (2006.01)
 G06F 9/46   (2006.01)

(52) U.S. Cl. .................. 718/1; 718/100; 718/102

(58) Field of Classification Search ................ 707/200, 707/201, 206; 718/1, 100, 102, 104
See application file for complete search history.

(56) References Cited

U.S. PATENT DOCUMENTS

| 5,826,082 | A  | * | 10/1998 | Bishop et al. ............... 718/104 |
| 6,081,826 | A  | * | 6/2000  | Masuoka et al. ........... 718/100 |
| 6,173,294 | B1 | * | 1/2001  | Azagury et al. ............. 707/206 |
| 6,249,836 | B1 | * | 6/2001  | Downs et al. ............... 710/268 |
| 6,272,519 | B1 | * | 8/2001  | Shearer et al. .............. 718/100 |
| 6,286,025 | B1 | * | 9/2001  | Chang ......................... 718/100 |
| 6,385,639 | B1 | * | 5/2002  | Togawa ....................... 709/200 |
| 6,560,773 | B1 | * | 5/2003  | Alexander et al. .......... 717/128 |
| 6,629,113 | B1 | * | 9/2003  | Lawrence .................... 707/206 |
| 6,654,948 | B1 | * | 11/2003 | Konuru et al. .............. 717/127 |
| 6,868,448 | B1 | * | 3/2005  | Gupta et al. ................ 709/226 |

FOREIGN PATENT DOCUMENTS

| JP | 8123700 | 5/1996 |
| JP | 991232  | 4/1997 |

OTHER PUBLICATIONS

Copy of a reference cited in an Office Action dated Feb. 4, 2005, by the Patent Office of People's Republic of China in the Corresponding Chinese patent application with an English translation of the Japenese translation (CPEL0151516).

* cited by examiner

*Primary Examiner*—Meng-Al T. An
*Assistant Examiner*—Syed J Ali

(57) ABSTRACT

When requested by an application, a library unit provides a resource to the application, acquires an ID for identifying the application which has requested the resource, and stores a combination of a resource name of the provided resource and the application ID in a table. When an application is completed, the library unit receives an application ID of the completed application, detects a resource name corresponding to the received application ID in the table, and collects a resource specified by the resource name.

3 Claims, 27 Drawing Sheets

FIG. 2 typedef void(*CALLBACK_f)(int Appid)

FIG. 3

```
1   CALLBACK_f callf[100];
2
3   void init() {
4      for (I-0;I<100; I++ ) callf[I]=null;
5   }
6   int add_callf(CALLBACK_f callfunc){
7      for (I=0; I<100; I++ ){
8         if ( callf[I]==null) {
9            callf[I] = callfunc;
10           return(1);
11        }
12     }
13     return(-1);
14  }
15
16  void remove_callf(CALLBACK_f callfunc){
17     for (I=0; I<100; I++){
18        if ( callf[I]==callfunc ) callf[I] = null;
19     }
20  }
21
22  void call_callback (int Appid) {
23     for(I=0; I<100; I++ ){
24        if ( (callf[I] !=null) (*callf[I])(Appid);
25     }
26  }
```

| APPLICATION ID | FILENAME |
|---|---|
| 1 | a.txt |
| | |

(2)

| APPLICATION ID | FILENAME |
|---|---|
| 1 | a.txt |
| 2 | b.txt |

(3)

| APPLICATION ID | FILENAME |
|---|---|
| 1 | a.txt |
| | |

FIG. 9

```
public interface resourceCollectionListener{
   public void update();
}
```

FIG. 10

```
public class applicationProxy {
   public string name;  // application name public int getStatus() {
      // get the status of application,paues or destroy
   } public addListener(resourceCollectionListener 1){
      // register resource collection instance
   } public removeListener(resourceCollectionListener 1){
      // remove resource collection intance
   }
}
```

FIG. 11

```
public class fileCollectionListener
            implements resourceCollectionListener{
   String name;  // filename
   ApplicationProxy app;
                     // Application information instance public void update() {
      // release file which has filename
   }
}
```

FIG. 12
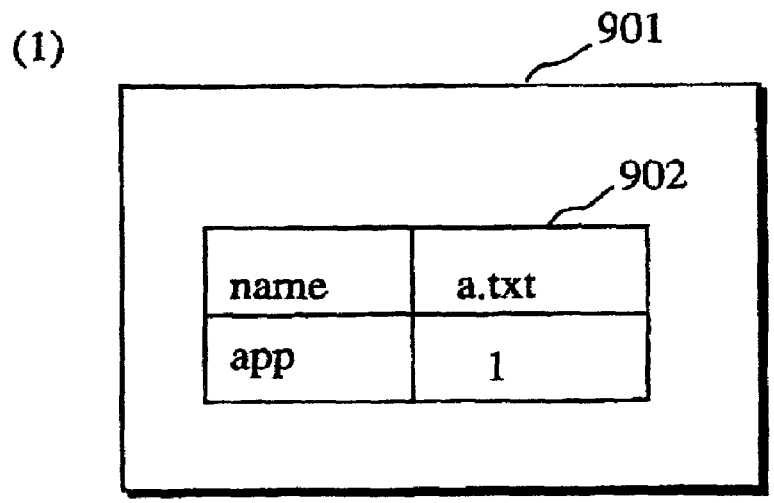
(1)
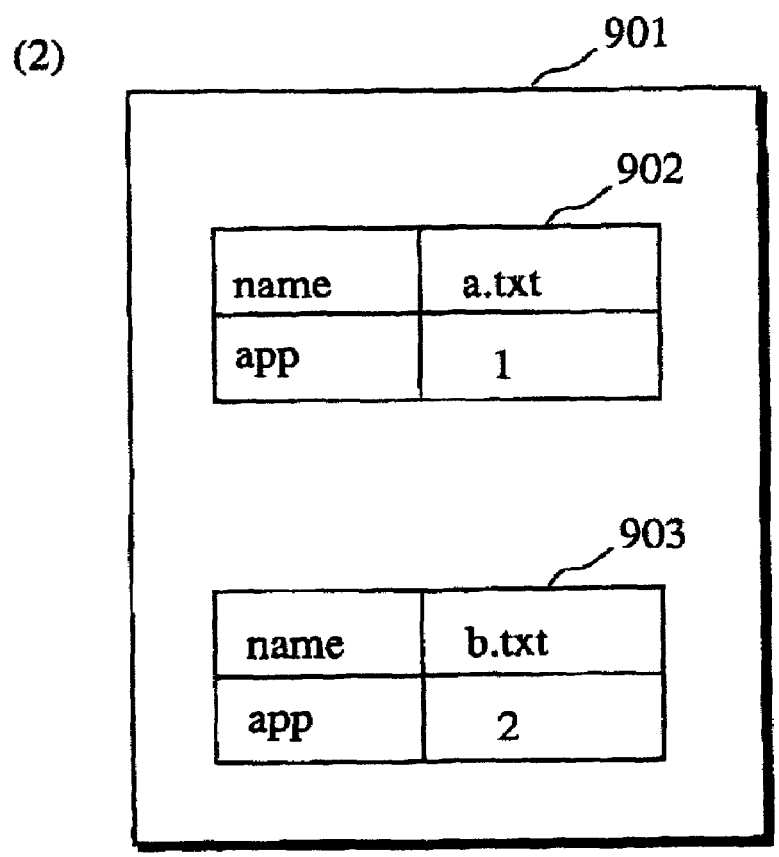
(2)

| APPLICATION ID | TASK ID | THREAD ID |
|---|---|---|
| 1 | 201 | 1,2 |
| 2 | 202 | 4,5,6 |

(2)

| APPLICATION ID | TASK ID | THREAD ID |
|---|---|---|
| 1 | 201 | 1,2,7 |
| 2 | 202 | 4,5,6 |

(3)

| APPLICATION ID | TASK ID | THREAD ID |
|---|---|---|
| 1 | 201 | 1,2,7 |
| 2 | 202 | 4,6 |

| APPLICATION ID | THREAD INSTANCE | LISTENER INSTANCE |
|---|---|---|
| 1 | thread10 | L1,L4 |

(2)

| APPLICATION ID | THREAD INSTANCE | LISTENER INSTANCE |
|---|---|---|
| 1 | thread10 | L1,L4 |
| 2 | thread20 | L6 |

(3)

| APPLICATION ID | THREAD INSTANCE | LISTENER INSTANCE |
|---|---|---|
| 2 | thread20 | L6 |

| APPLICATION ID | CLASS LOADER |
|---|---|
| 1 | classloader1 |
| 2 | classloader2 |

| APPLICATION ID | FILE |
|---|---|
| 1 | A.txt B.txt |
| 2 | C.txt |

APPLICATION EXECUTION APPARATUS AND METHOD

This application is based on applications Nos. 2000-141492, 2000-141493, and 2000-398746 filed in Japan, the contents of which are hereby incorporated by reference.

BACKGROUND OF THE INVENTION (1) Field of the Invention

The present invention relates to techniques for collecting resources which become unnecessary as a result of completion of an application, in an application execution apparatus.

(2) Related Art

In general application execution apparatuses, the kernel of the operating system collects resources (devices such as memory and keyboard) which become unnecessary as a result that, for example, an application is completed. In this Specification, "collection" means that the operating system side, such as the kernel, regains a resource which has been provided to an application, from the application. To collect resources, the kernel stores a collection procedure for each device. When a device used by some application becomes unnecessary, the kernel collects that device in accordance with a collection procedure for the device. In this way, resources can be efficiently utilized.

Also, in Java application execution apparatuses, for instance in personal computers, as for collection of resources other than memory, the Java middleware (so-called "virtual machine") itself does-not collect the resources, but when the Java middleware ends, the kernel collects' the resources.

On the other hand, the collection of memory is performed by the Java middleware through garbage collection. The garbage collection is to collect unnecessary areas in memory. In Java, an application is loaded by loading each instance ("object") of a plurality of classes that make up the application, into memory. Memory areas are shared by the objects loaded for the application, and are allocated to the objects in the order of loading. Therefore, if objects of a plurality of applications are sequentially loaded into memory, noncontiguous memory areas will end up being allocated to objects which belong to the same application. When memory areas are occupied by objects in such a noncontiguous manner, garbage collection is performed to resolve insufficient memory.

However, the aforementioned resource collection techniques have the following problems.

First, in the resource collection by the kernel is an application execution apparatus, each time a new device is added to the application execution apparatus, a collection procedure for the new device has to be stored in the kernel.

Secondly, in the resource collection in a Java application execution apparatus, if two or more applications are sequentially executed while the Java middleware is running, the kernel does not collect resources other than memory until the Java middleware ends. In other words, even when one application ends, resources other than memory which have been provided to that application are not collected. This being so, if the next application requires the same resources, the next application cannot be executed.

Thirdly, when memory areas noncontiguously allocated to objects become unnecessary, the burden of garbage-collecting such memory areas is significant.

SUMMARY OF THE INVENTION

In view of the above problems, the first object of the present invention is to provide an application execution apparatus that performs resource collection without depending on the kernel.

The stated object can be achieved by an application execution apparatus including a kernel unit and at least one library unit which provides resources to applications, wherein the kernel unit includes a notifying unit for notifying, when an application is completed, each library unit which has provided a resource to the application, of the application, and each library unit includes a collecting unit for collecting the resource provided to the application, upon receiving the notification from the notifying unit.

Here, the collecting unit may include: a table holding unit for holding a table which shows a correspondence between applications and resources provided to the applications: and a resource specifying unit for specifying the resource provided to the application notified by the notifying unit, based on the table in the table holding unit.

Here, each library unit may further include: a providing unit for providing the resource to the application, in accordance with a request from the application; and a requesting unit for requesting, when the providing unit first provides the resource to the application, the notifying unit to make the notification when the application is completed.

The stated object can also be achieved by a computer-readable recording medium recording a program for use in an application execution apparatus-equipped with a kernel unit and a plurality of library units which provide resources to applications, the program including: a notifying step in the kernel unit for notifying, when an application is completed, each library unit which has provided a resource to the application, of the application; and a collecting step in each library unit for collecting the resource provided to the application, upon receiving the notification.

With these constructions, whenever an application ends, not the kernel unit but the library units collect resources which are no longer necessary. Accordingly, it becomes unnecessary to modify the kernel unit each time a new resource is introduced.

Here, the notifying unit may include a plurality of notifying subunits which each correspond to a different application, wherein each library unit further includes: a providing unit for providing the resource to the application, in accordance with a request from the application; and a requesting unit for requesting, when the providing unit first provides the resource to the application, a notifying subunit corresponding to the application to make the notification by calling a method of a resource collection instance when the application is completed, and the notifying unit makes the notification by calling the method of the resource collection instance, when the application is completed.

With this construction, the notification of the completed application is made only to library units which have provided resources to the completed application. Accordingly, the resources can be collected without the waste of notifying other library units which have not provided resources to the application.

Here, when at least two applications are completed at the same time, the notifying unit may notify each library unit which has provided resources to the applications, of the applications, wherein the collecting unit includes: a table holding unit for holding a table showing a correspondence between applications and resources provided to the applications; and a resource specifying unit for specifying the resources provided to the applications notified by the notifying unit, based on the table in the table holding unit, and the collecting unit collects the specified resources.

With this construction, the library units can collect all resources at one time that have been provided to the completed applications, which benefits efficient resource collection.

Here, the notifying unit may make the notification when the application is completed or suspended, wherein each library unit further includes a judging unit for judging whether the resource provided to the application should be collected, depending on whether the application has been completed or suspended, and the collecting unit collects the resource provided to the application, when the judging unit judges that the resource should be collected.

Here, the notifying step may make the notification when the application is completed or suspended, wherein the program further includes a judging step in each library unit for judging whether the resource provided to the application should be collected, depending on whether the application has been completed or suspended, and the collecting step collects the resource provided to the application, when the judging step judges that the resource should be collected.

With these constructions, whether to collect resources is judged depending on whether an application is completed or suspended, with it being possible to collect only a part of the resources.

The second object of the invention is to provide a Java application execution apparatus that can sequentially execute Java applications without restarting Java middleware.

The stated object can be achieved by an application execution apparatus including a Java middleware unit and an OS (Operating System) unit which provides resources to applications, wherein the Java middleware unit includes: a first table holding unit for holding a table which shows a correspondence between applications tasks corresponding to the applications, and threads which make up each task; and a notifying unit for notifying, upon receiving an instruction to complete an application, the OS unit of a task corresponding the application, based on the table in the first table holding unit, and the OS unit includes: a task generating unit for generating the task for executing the application; a thread generating unit for generating application threads which make up the task generated by the task generating unit; a controlling unit for executing the generated application threads to execute program codes of the application, providing resources to the application in accordance with a request from the application, and registering a correspondence between the provided resources and the task to which the application threads belong, into a table showing a correspondence between provided resources and tasks corresponding to applications; and a collecting unit for specifying the resources corresponding to the task notified by the notifying unit based on the table in the controlling unit, and collecting the specified resources.

The stated object can also be achieved by a computer-readable recording medium recording a program for use in an application execution apparatus equipped with a Java middleware unit and an OS unit which provides resources to applications, the Java middleware unit including a first table holding unit for holding a table which shows a correspondence between applications, tasks corresponding to the applications, and threads which make up each task, the program including: a notifying step in the Java middleware unit for notifying, upon receiving an instruction to complete an application, the OS unit of a task corresponding the application, based on the table in the first table holding unit; a task generating step in the OS unit for generating the task for executing the application; a thread generating step in the OS unit for generating application threads which make up the task generated in the task generating step; a controlling step in the OS unit for executing the generated application threads to execute program codes of the application, providing resources to the application in accordance with a request from the application, and registering a correspondence between the provided resources and the task to which the application threads belong, into a table showing a correspondence between provided resources and tasks corresponding to applications; and a-collecting step in the OS unit for specifying the resources corresponding to the task notified by the notifying step based on the table, and collecting the specified resources.

With these constructions, resources which are no longer necessary are collected whenever an application is completed, with it being possible to reserve resources for sequentially executing Java applications.

Here, the Java middleware unit may further include: a resource reserve thread generating unit for generating a resource reserve thread for reserving resources necessary for the Java middleware unit; and a resource reserving unit for reserving the resources necessary for the Java middleware unit, by executing the resource reserve thread, wherein the collecting unit specifies the resources corresponding to the notified task based on the table in the controlling unit, and collects the specified resources, without collecting the resources reserved by the resource reserving unit.

With this construction, resources necessary for the operation of the Java middleware unit are reserved, and will not be collected even when an application is completed. As a result, a new application can be executed more quickly.

The third object of the invention is to provide a Java application execution apparatus that can reduce the burden of garbage collection.

The stated object can be achieved by an application execution apparatus for managing a memory heap area for applications which requires garbage collection, including: a divided heap area acquiring unit for acquiring a divided heap area in the memory heap area, when an application is started; an allocating unit for allocating the divided heap area acquired-by the divided heap area acquiring unit, to the application; and a memory releasing unit for releasing the divided heap area allocated to the application, when the application is completed.

The stated object can also be achieved by a memory heap management method used in an apparatus for managing a memory heap area for applications which requires garbage collection, including: a divided heap area acquiring step for acquiring a divided heap area in the memory heap area, when an application is started; an allocating step for allocating the divided heap area acquired by the divided heap area acquiring step, to the application; and a memory releasing step for releasing the divided heap area allocated to the application, when the application is completed.

The stated object can also be achieved by a computer-readable recording medium recording a program for use in an apparatus that executes applications using a memory heap area which requires garbage collection, the program including: a divided heap area acquiring step for acquiring a divided heap area in the memory heap area, when an application is started; an allocating step for allocating the divided heap area acquired by the divided heap area acquiring step, to the application; and a memory releasing step for releasing the divided heap area allocated to the application, when the application is completed.

With these constructions, whenever an application is completed, a divided heap area allocated to the application is released, which makes it unnecessary to perform garbage collection on the divided heap area. This reduces the burden of garbage collection.

Here, the application execution apparatus may further include: an object area acquiring unit for acquiring an object area in the divided heap area, for an object relating to the application; and a garbage collecting unit for performing garbage collection on the divided heap area.

Here, the memory heap management method may further include: an object area acquiring step for acquiring an object area in the divided heap area, for an object relating to the application; and a garbage collecting step for performing garbage collection on the divided heap area.

Here, the program may further include: an object area acquiring step for acquiring an object area in the divided heap area, for an object relating to the application; and a garbage collecting step for performing garbage collection on the divided heap area.

With these constructions, garbage collection is performed for each divided heap area which is smaller in size than the whole memory heap area. As a result, the burden of one garbage collection operation can be reduced.

Here, the application execution apparatus may further include a locking unit for suspending the execution of the application while the garbage collecting unit is performing the garbage collection on the divided heap area.

Here, the memory heap management method may further include a locking step for suspending the execution of the application while the garbage collecting step is performing the garbage collection on the divided heap area.

Here, the program may further include a locking step for suspending the execution of the application while the garbage collecting step is performing the garbage collection on the divided heap area.

With these constructions, during garbage collection, the execution of applications other than an application that uses a divided heap area that is being garbage-collected continues, which enables the user to carry on operations using the other applications without waiting for the garbage collection to finish.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIG. 2 shows an example of a C program which defines a callback function;

FIG. 3 shows an example of a C program which describes a procedure of registering and calling the callback function;

FIG. 5 shows a table listing combinations of application IDs and resource names (filenames), in a library unit for controlling a file system;

FIG. 9 shows an example of a Java program which defines an interface;

FIG. 10 shows an example of a class for generating an application information instance;

FIG. 11 shows an example of a resource collection class;

FIG. 12 shows an example of resource collection instances generated by the resource collection class;

FIG. 16 shows a table listing each combination of an application, a task generated corresponding to the application, and threads which compose the task;

FIG. 19 shows a table held in a class library unit;

DESCRIPTION OF THE PREFERRED EMBODIMENT(S)

First Embodiment

In an application execution apparatus of the first embodiment of the invention, each time an application is completed or the like, not a kernel unit but library units collect resources provided to the application.

Here, "application" denotes either a program or a function realized by executing the program. Also, "resource" denotes a tuner, an MPEG audio decoder, an MPEG video decoder, a keyboard input device, a remote control input device, a mouse input device, a trackball input device, a mutex, a semaphore, a network device, a serial device, an IEEE1394 (Institute of Electrical and Electronics Engineers 1394) interface, an USB (Universal Serial Bus) device interface, a file system, a display device, a memory, a modem, or the like. The library units are a group of device drivers that control (reserve, manage, collect) resources in accordance with a request from an application.

More specifically, when an application requests provision of a resource, a library unit provides the resource to the application, acquires an application ID for identifying the application that has requested the resource, and stores the name of the provided resource and the application ID together in a table. When the application is completed, the library unit receives the application ID of the completed application, searches the table for the resource name corresponding to the received application ID, and collects the resource specified by the resource name.

The details on this application execution apparatus are explained below, with reference to the drawings.

Figure 1:
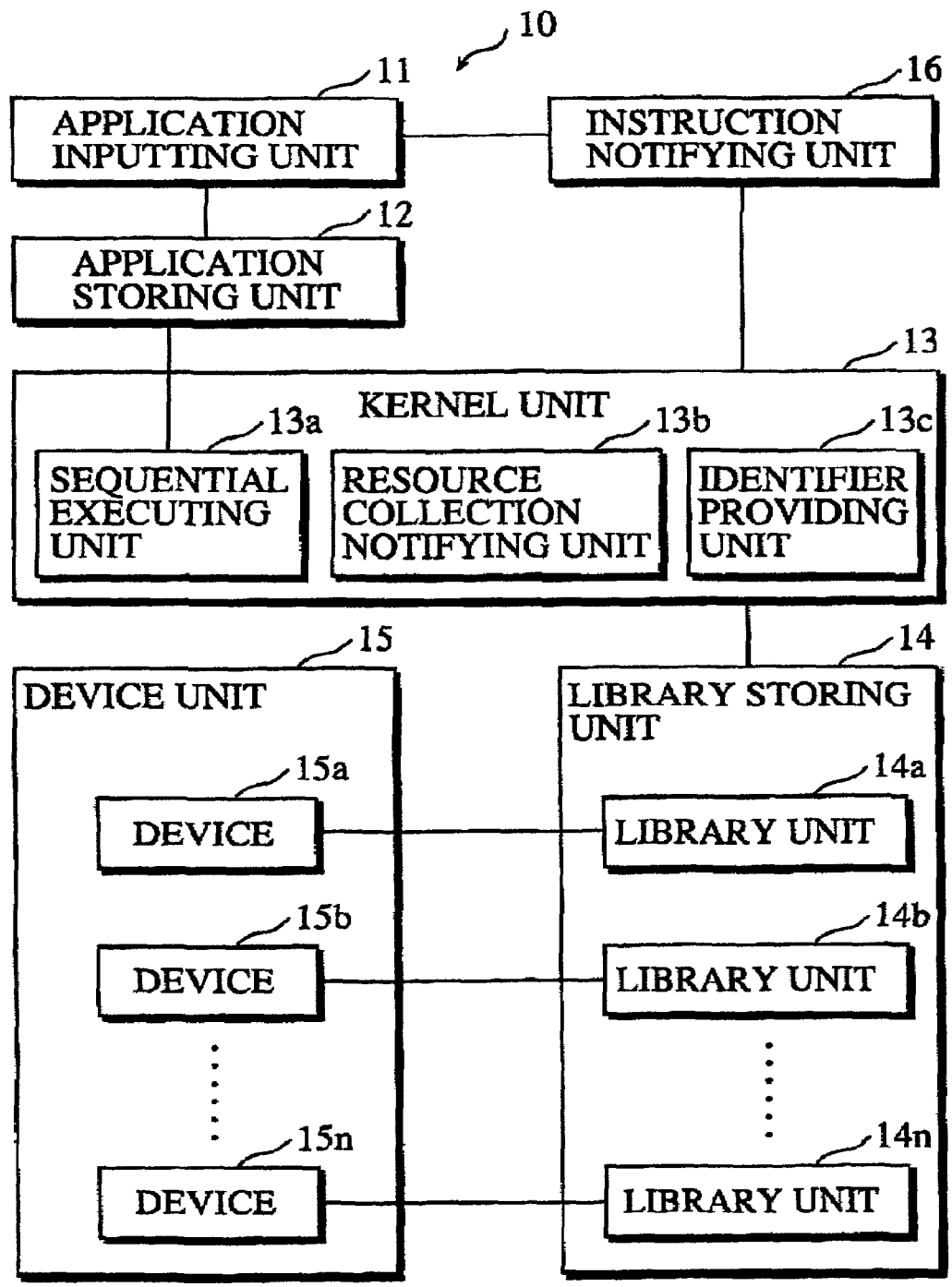
FIG. 1 is a block diagram showing a construction of an application execution apparatus according to the first embodiment of the invention.

FIG. 1 is a block diagram showing a construction of an application execution apparatus 10. The application execution apparatus 10 includes an application inputting unit 11, an application storing unit 12, a kernel unit 13, a library storing unit 14, a device unit 15, and an instruction notifying unit 16.

The application inputting unit 11 is made up of a floppy disk drive, a CD drive, a network interface board, a broadcast receiver, or the like. The application inputting unit 11 receives applications to be executed, and stores the applications into the application storing unit 12.

The application storing unit 12 is made up of an RAM, an ROM, a hard disk, a CD ROM drive, a floppy disk, or the like. The application storing unit 12 stores the applications outputted from the application inputting unit 11, or applications retained beforehand.

The kernel unit 13 includes a sequential executing unit 13a, a resource collection notifying unit 13b, and an identifier providing unit 13c. The kernel unit 13 executes each application stored in the application storing unit 12.

Here, when an application to be executed is a binary program, the sequential executing unit 13a is implemented by a CPU or the like that executes the binary program as it is. When the application to be executed is an intermediate code such as a Java bytecode (Java is a trademark of Sun Microsystems, Inc), the sequential executing unit 13a is implemented by a module (a virtual machine (VM) or an interpreter) or the like that sequentially analyzes the intermediate code and executes it. The sequential executing unit 13a reads an application stored in the application storing unit 12, and executes it. Also, the sequential executing unit 13a instructs library units in the library storing unit 14 to provide resources requested by the application being executed, and receives the resources from the library units.

The resource collection notifying unit 13b notifies, each time an application is completed, each library unit in the library storing unit 14 which has provided a resource to the application, of a resource collection request and an application ID of the application. To be more specific, the resource collection notifying unit 13b accepts registration of a callback function from each library unit which has provided a resource to an application. When notified by the instruction notifying unit 16 that the application is completed or suspended, the resource collection notifying unit 13b calls and executes the registered callback function, and notifies each library unit of the application ID of the application.

Here, "registration of a callback function" means that, upon providing a new resource to an application in response to a request from the application, a library unit requests the resource collection notifying unit 13b to notify, when the application is completed or suspended, of an application ID of the application by calling and executing the callback function.

FIG. 2 shows an example of a C program that defines a callback function. In the drawing, "CALLBACK_f" indicates a type name of the callback function. This callback function has no return values, and takes an integer as an argument.

FIG. 3 shows an example of a C program that describes the registration, deletion, and execution of the callback function. Lines 6–14 show an example program for registering the callback function, lines 16–20 show an example program for deleting the callback function, and lines 22–26 show an example program for executing the callback function.

The identifier providing unit 13c provides an application ID when requested by a library unit.

The library storing unit 14 includes multiple library units 14a–14n for controlling devices as resources. Each library unit controls a corresponding device in the device unit 15 (e.g. the library unit 14a controls a device 15a, and the library unit 14b controls a device 15b). The library storing unit 14 is made up of an ROM or a hard disk, and the device control by each library unit is realized whereby an application calls and executes a program describing a set of functions for device control.

Specifically, each library unit controls a corresponding device (one or more resources) in the following manner. A library unit provides a resource in response to a request from an application, and registers a callback function in the resource collection notifying unit 13b. The library unit then acquires an application ID of the application which has requested the resource, from the identifier providing unit 13C, and writes the application ID and a resource name of the provided resource together in a table. When the registered callback function is executed by the resource collection notifying unit 13b and the application ID of the application provided with the resource to be collected is notified, the library unit detects the resource name corresponding to the notified application ID in the table, and collects the resource specified by the resource name.

Figure 4:
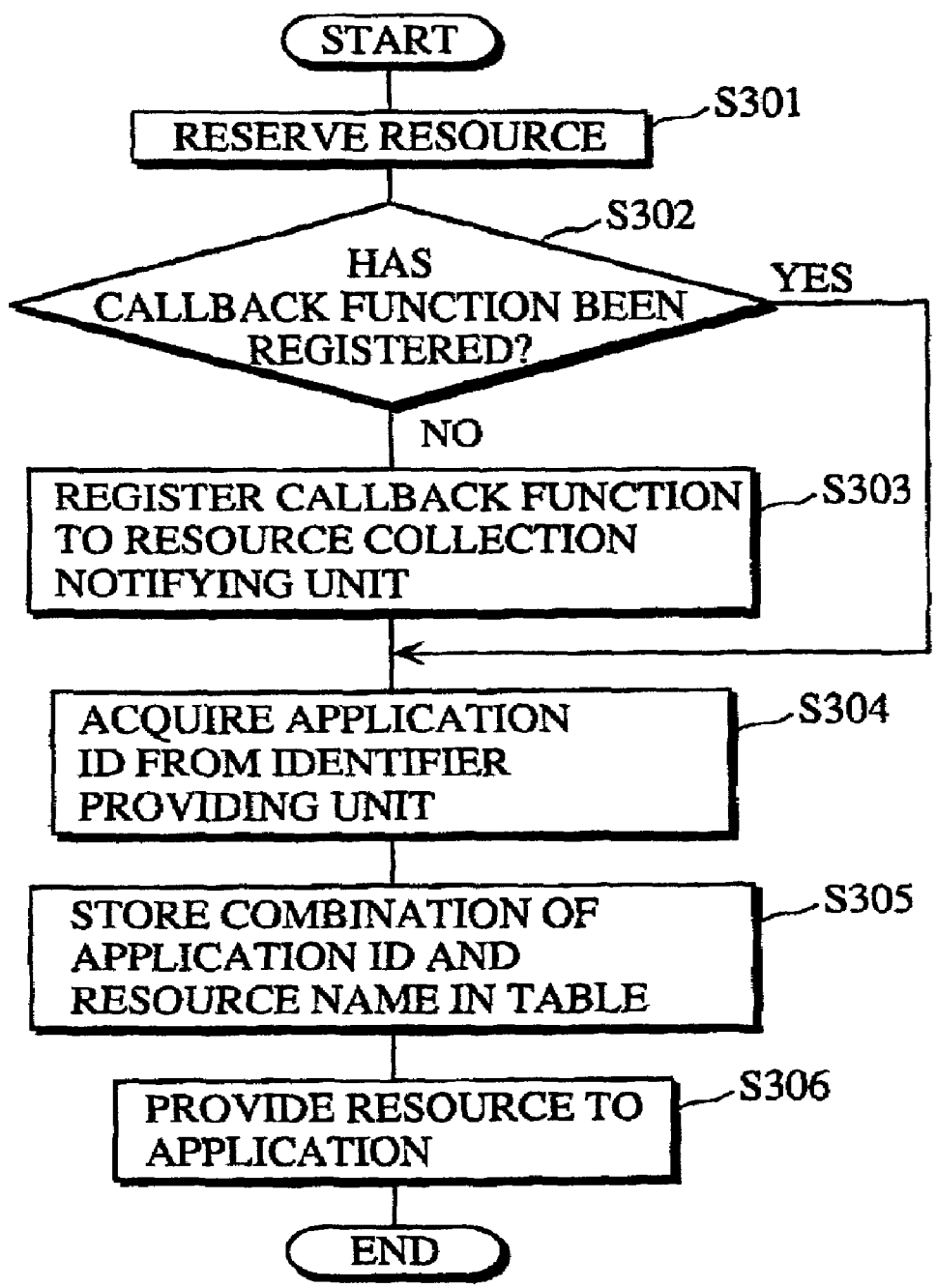
FIG. 4 is a flowchart showing a resource providing operation of each library unit shown in FIG. 1.

A resource providing operation which each library unit performs in response to a request from an application is explained below, with reference to FIG. 4. FIG. 4 is a flowchart showing the resource providing operation of each library unit. A library unit reserves a resource in response to a request from an application (S301) and judges whether a callback function has been registered (for instance by setting a flag for the callback function and making the judgement using the flag) (S302). If the callback function has not been registered, the library unit registers the callback function to the resource collection notifying unit 13*b* (S303).

Next, the library unit acquires an application ID of the application which has requested the resource, from the identifier providing unit 13*c* (S304), and stores the acquired application ID and a resource name of the reserved resource in combination, into a table (S305). The library unit then provides the resource to the application (S306). If the callback function has already been registered in step S302, the library unit executes steps S304–S306, without registering the callback function again.

An example of the aforementioned table is shown in FIG. 5. FIG. 5 shows a table listing combinations of application IDs and resource names (filenames) held in a library unit for controlling a file system (hereafter, "library unit F"). In (1), the library unit F registers a callback function to the resource collection notifying unit 13*b*, and provides a resource with a filename "a.txt" to an application with an application ID "1". This being so, when another application with an application ID "2" requests provision of a resource with a filename "b.txt" by calling a function of the library unit F, the library unit F reserves the requested resource, and acquires the application ID "2" from the identifier providing unit 13*c*. Here, since the callback function of the library unit F has already been registered, the callback function will not be registered again. The library unit F stores the combination of the acquired application ID "2" and the filename "b.txt" of the reserved resource in the table, thereby renewing the table as shown in (2).

Figure 6:
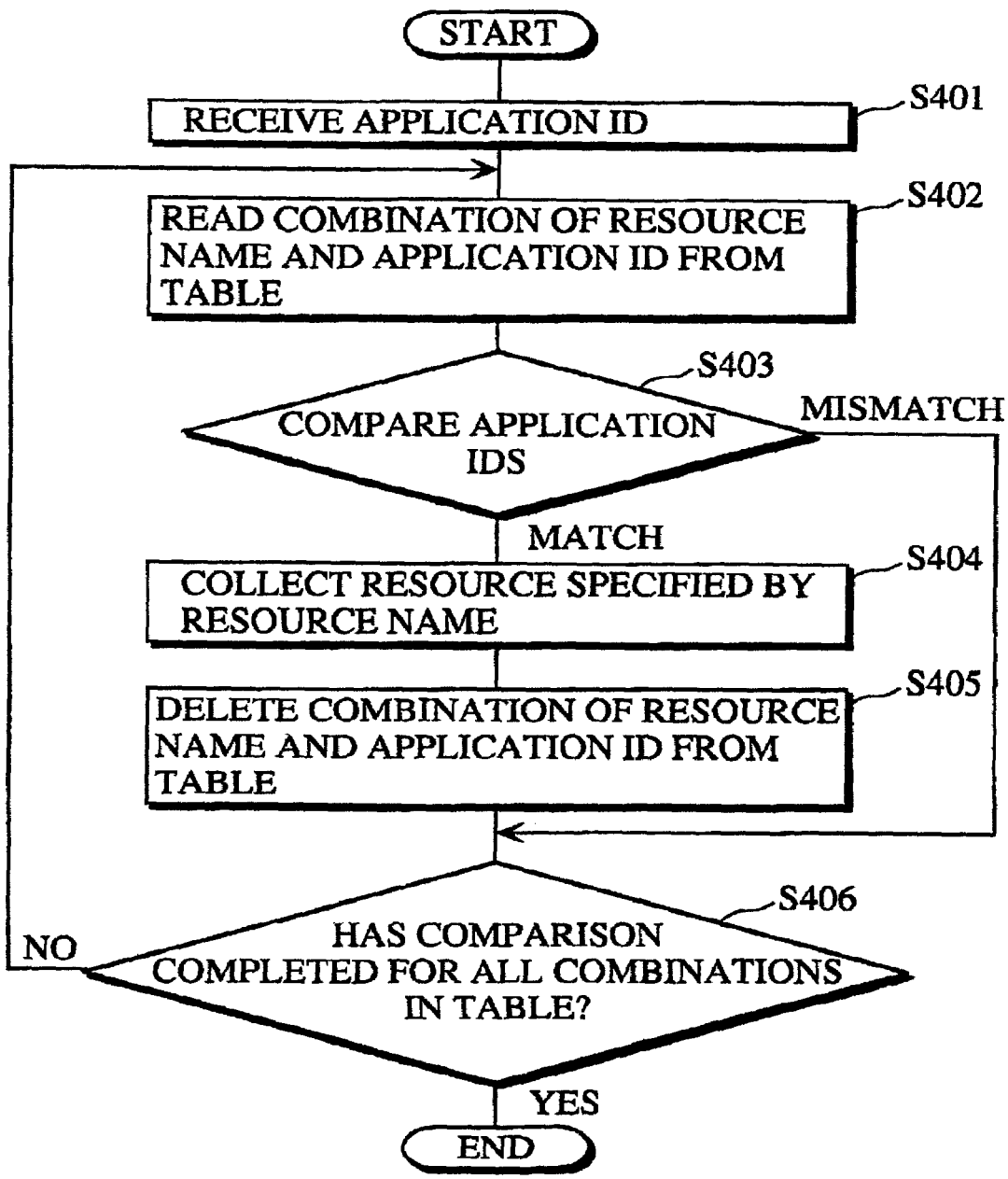
FIG. 6 is a flowchart showing a resource collecting operation of each library unit shown in FIG. 1.

Next, a resource collecting operation of each library unit is explained with reference to FIG. 6. FIG. 6 is a flowchart showing the resource collecting operation of each library unit. When a callback function is called, a library unit receives an application ID from the resource collection notifying unit 13*b* (S401), reads a combination of an application ID and a resource name from a table held therein (S402), and compares the received application ID with the read application ID (S403). When the two application IDs match, the library unit collects a resource specified by the read resource name (S404), and deletes the combination from the table (S405). If the comparison in step S403 has been completed for all combinations in the table (S406), the operation ends. In the case of (2) in FIG. 5, for instance, when the received application ID is "2", the application ID "2" and the corresponding filename "b.txt" are deleted from the table, as shown in (3). When the two application IDs do not match, and if the comparison has not been completed for all combinations in step S406, the library unit reads the next combination from the table and repeats steps S403–S406. If the comparison has been completed for all combinations, on the other hand, the operation ends.

The devices 15*a*–15*n* include a memory, a display, an input device (e.g. a keyboard, a remote control), a file system, a network device, and others. Each device operates in accordance with control which is exercised by an application through a corresponding library unit in the library storing unit 14.

The instruction notifying unit 16 performs the processes of starting, suspending, restarting, and completing an application.

The application start process is to instruct the sequential executing unit 13*a* to execute an application stored in the application storing unit 12.

The application suspend process is to instruct the sequential executing unit 13*a* to suspend the execution of the application, and is to notify, if necessary, the resource collection notifying unit 13*b* of the suspension of the application.

The application restart process is to instruct the sequential executing unit 13*a* to restart the execution of the application which has been suspended.

The application completion process is to instruct the sequential executing unit 13*a* to complete the execution of the application, and is to notify the resource collection notifying unit 13*b* of the completion of the application.

Figure 7:
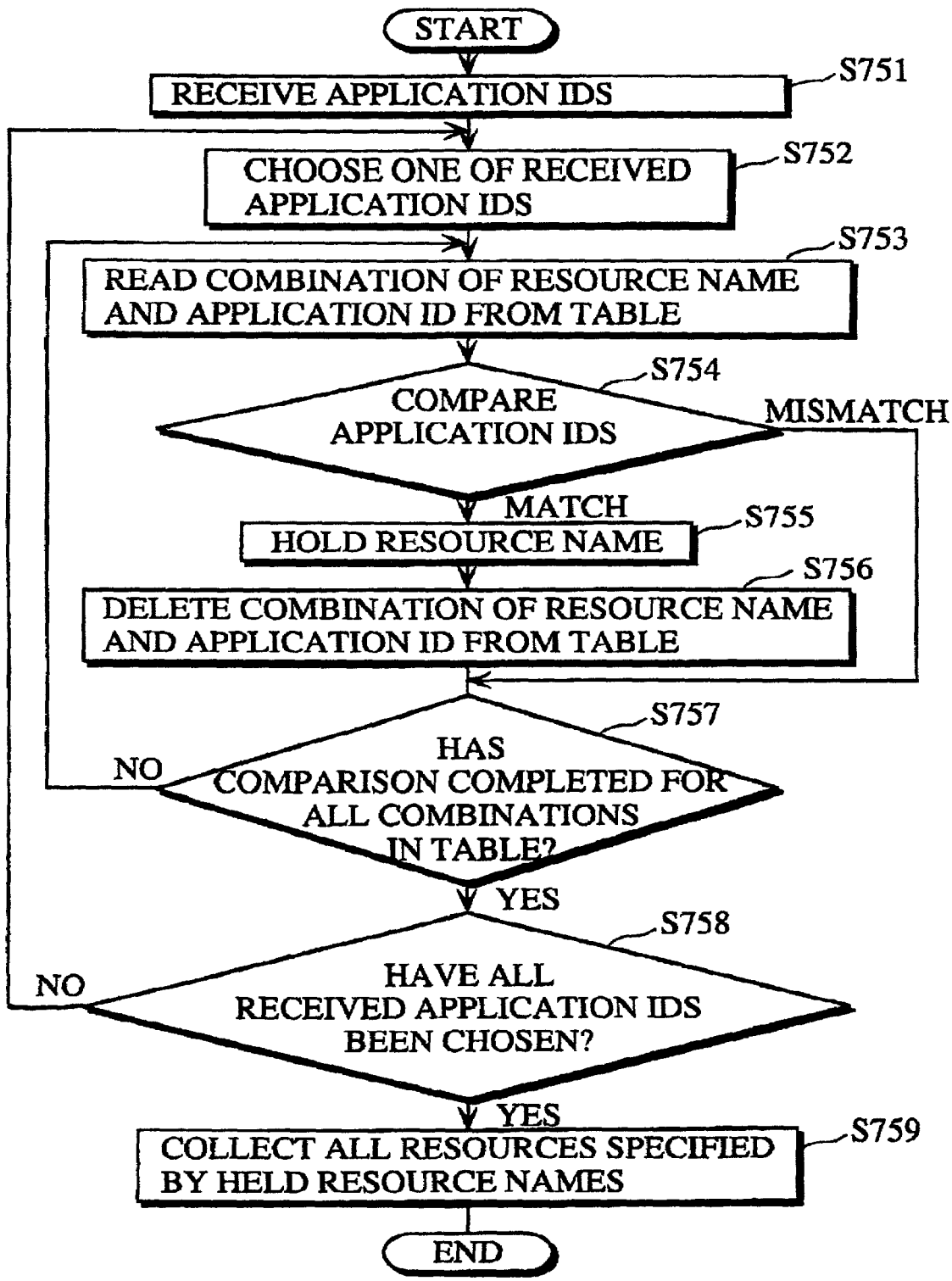
FIG. 7 is a flowchart showing a resource collecting operation of each library unit, when a plurality of applications are completed at the same time.

The above embodiment describes the case where, when an application is completed or suspended, an application ID of the application is notified to each library unit that has provided a resource to the application. However, if more than one application are completed at the same time, application IDs of those applications may be notified to each library unit which has provided resources to the applications. FIG. 7 is a flowchart showing a resource collecting operation of each library unit in this case. A library unit receives application IDs of applications which have been provided with resources to be collected, from the resource collection notifying unit 13*b* (S751). The library unit then chooses one of the received application IDs (S752), reads a combination of an application ID and a resource name from a table held therein (S753), and compares the chosen application ID with the tread application ID (S754). If the two application IDs match, the library unit holds the read resource name as a name of a resource to be collected (S755), and deletes the combination from the table (S756). If the comparison in step S754 has been completed for all combinations in the table (S757), the library unit chooses the next application ID from the received application IDs (S752), and repeats step S753–S757. Once steps S752–S757 have been performed for all of the received application IDs (S758), the library unit collects all resources specified by the resource names held in step S755 (S759).

In this way, each library unit can collect resources efficiently. For instance, when all resources managed by the same library unit become unnecessary as a result of the completion of a plurality of applications, these resources can be collected quickly just by initializing a table held in that library unit.

Second Embodiment

In the first embodiment, each library unit registers a callback function which is to be called when an application is completed or suspended. In the second embodiment, each library unit generates a resource collection instance which is analogous to the callback function in the first embodiment, and collects a resource provided to an application when the application is completed or suspended. A resource collection instance referred to here is a program which is generated from a class (a Java bytecode program) stored in each library unit, and which includes certain information and a method that is a function for retrieving the certain information. That is to say, the resource collection instance holds information about an application which has requested provision of a resource, information about the provided resource, and a method for retrieving these information. These information can be retrieved by calling the method of the class.

Figure 8:
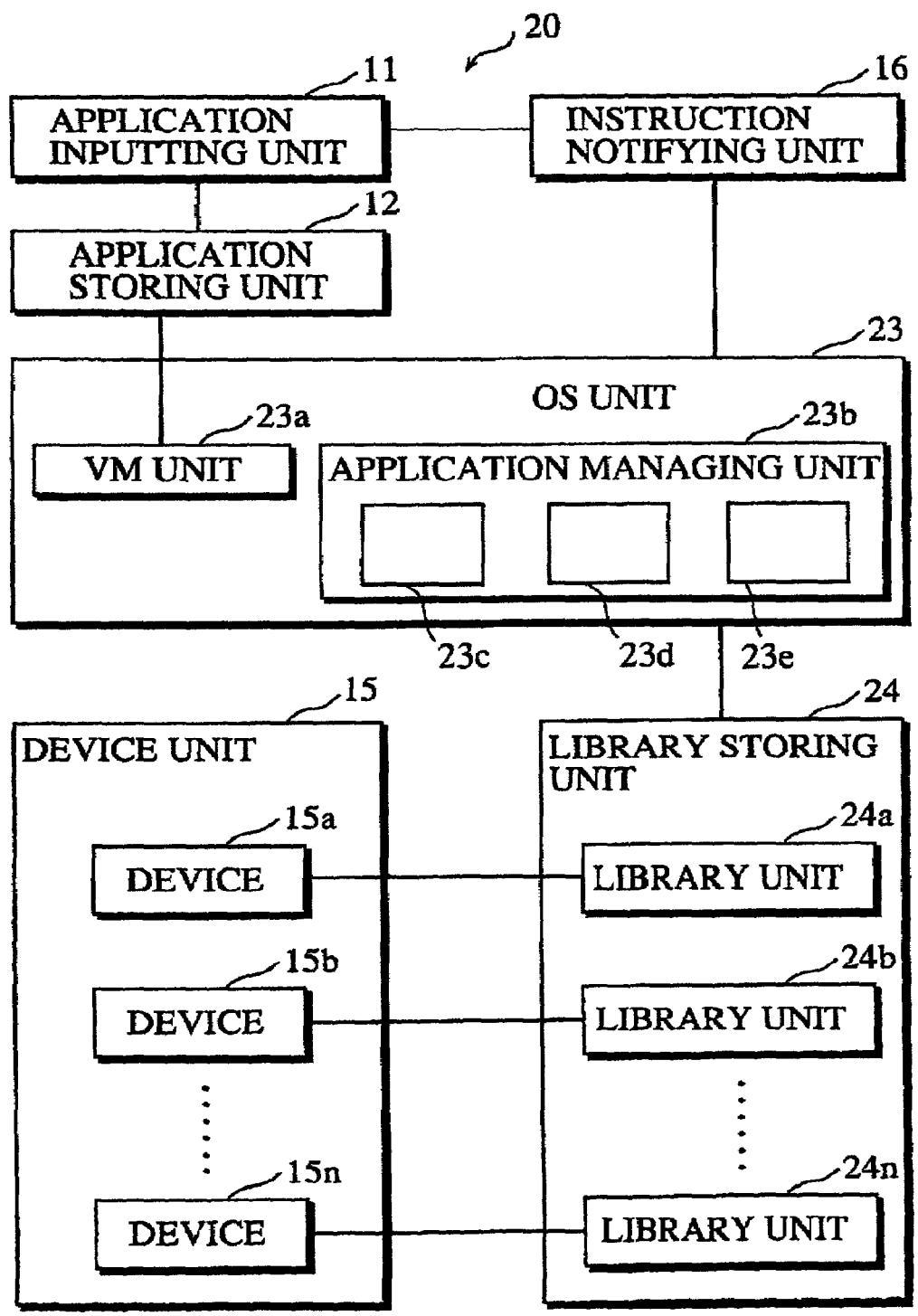
FIG. 8 is a block diagram showing a construction of an application execution apparatus according to the second embodiment of the invention.

An application execution apparatus of this embodiment is described below, with reference to the drawings. FIG. 8 is a block diagram showing a construction of an application execution apparatus 20. The application execution apparatus 20 includes the application inputting unit 11, the application storing unit 12, an OS unit 23, a library storing unit 24, the device unit 15, and the instruction notifying unit 16. The application inputting unit 11, the application storing unit 12, the device unit 15, and the instruction notifying unit 16 are the same as those in the first embodiment, so that their explanation has been omitted here.

The OS unit 23 includes a VM unit 23a and an application managing unit 23b, and executes a Java application (hereafter simply referred to as "application") stored in the application storing unit 12.

The VM unit 23a loads an application from the application storing unit 12, sequentially analyzes bytecodes of the loaded application, and executes the application. The VM unit 23a also controls each device in the device unit 15, via a library unit in the library storing unit 24. This control of each device is realized whereby the application executed by the VM unit 23a calls and executes a class in a library unit which is a device control program.

The application managing unit 23b manages each application which is being executed by the VM unit 23a. The application managing unit 23b also has a function analogous to that of the identifier providing unit 13c in the first embodiment. More specifically, the application managing unit 23b generates, from a class that defines a procedure of storing application information, an instance which executes the procedure, for each application being executed. The application managing unit 23b then has the generated instance (hereinafter called "application information instance") store an application ID of the application. Such application information instances (23c–23e in FIG. 8) are used to manage the applications being executed. Also, when an application requests a library unit to provide a resource, the application managing unit 23b provides an application information instance of the application to the library unit, so that the library unit can identify the application which has requested the resource. Here, instead of storing an application ID in each application information instance, each application information instance itself may be used as an application ID.

Each application information instance has a function analogous to that of the resource collection notifying unit 13b in the first embodiment. Which is to say, each application information instance performs the following procedure. An application information instance accepts registration of a resource collection instance from a library unit. Here, "registration of a resource collection instance" means that, upon providing a new resource to an application, a library unit requests an application information instance which stores an application ID of the application to notify, when the application is completed or suspended, of the application. This notification is made by calling a method included in a resource collection instance generated at the time of registration. The resource collection instance is generated from a class in each library unit, in the following way. A class in each library unit implements an interface, and thereby implements a method defined by the interface. Here, an interface defines a method to be included in a class implementing the interface. FIG. 9 shows an example of such an interface. In this example, an interface "ResourceCollectionListener" defines a method "update". The class in each library unit implements this interface, to prepare a class defining a resource collection procedure in the method "update". A resource collection instance implementing the interface is generated from the prepared class, and registered in an application information instance. In so doing, the method ("update") defined by the interface is reliably implemented in the generated resource collection instance, and the above notification is made by calling the method defined by the interface.

When an application is completed or suspended, an application information instance holding an application ID of the application calls a method ("update") implemented in a registered resource collection instance, to make the above notification to a library unit which has provided a resource to the application.

Here, the application information instance may further include a method for removing the registered resource collection instance, and a method for getting the status of the application.

FIG. 10 shows an example of a-class for generating an application information instance storing these methods. In the drawing, "applicationProxy", which is a class for generating an application information instance, defines: an inner variable corresponding to an application name of an application, a method "getstatus" for getting the status of the application, a method "addListener" for registering a resource collection instance ("resourceCollectionListener"), and a method "removeListener" for removing the registered resource collection instance.

The library storing unit 24 includes multiple library units 24a–24n. These library units control the devices 15a–15n in the device unit 15, perform resource provision in response to a request from an application, and also perform resource collection. The library storing unit 24 is realized by an ROM or a hard disk, and the device control by each library unit is realized whereby an application calls and executes a program written in a set of classes for device control.

Each library unit performs the resource provision as follows. When requested to provide a resource from an application, a library unit provides the requested resource, calls the application managing unit 23b, and acquires an application information instance corresponding to the application which has requested the resource. The library unit then generates a resource collection instance from a resource collection class, and registers the generated resource collection instance in the application information instance. The library unit also stores a combination of a resource name of the provided resource and the application information instance, into the generated resource collection instance.

FIG. 11 shows a resource collection class for controlling a file system, as an example resource collection class. In the drawing, information of the inner variables "app" (corresponding to an application information instance) and "name" (corresponding to a filename), which are referred to as fields and are created when generating a resource collection instance, and the method "update" which is called when an application is completed or suspended to execute a resource collection procedure, are defined. FIG. 12 shows an example of a resource collection instance generated from the resource collection class shown in FIG. 11. Numeral 901 shows an instance table holding resource collection instances, and numerals 902 and 903 show generated resource collection instances. In (1), the resource collection instance 902 holds a resource name (filename "a.txt") of a provided resource and an application information instance ("1") in combination. In (2), a library unit provides a resource (a file with a filename "b.txt") to an application managed by another application information instance ("2"), and newly generates the resource collection instance 903.

Figure 13:
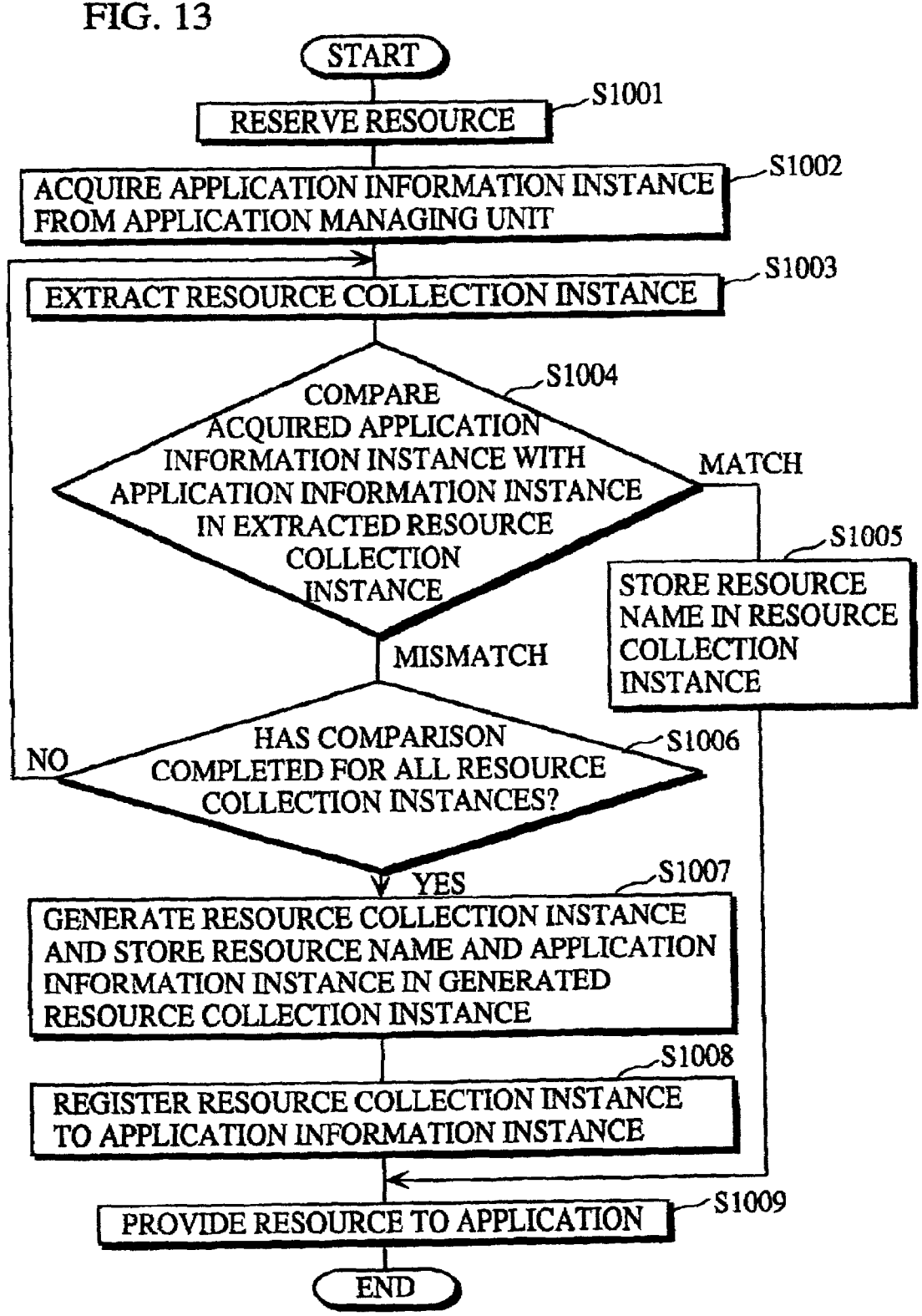
FIG. 13 is a flowchart showing a resource providing operation of each library unit shown in FIG. 8.

The resource provision processing is explained in more details below, with reference to FIG. 13. FIG. 13 is a flowchart showing a resource providing operation of each library unit. When requested to provide a resource from an application, a library unit reserves the requested resource (S1001), and acquires an application information instance corresponding to the application from the application managing unit 23b (S1002). Next, the library unit extracts a resource collection instance from an instance table held therein (S1003), and compares the application information instance acquired from the application managing unit 23b, with an application information instance included in the extracted resource collection instance (S1004) When the two application information instances match, the library unit stores a resource name of the reserved resource in the resource collection instance (S1005), and provides the reserved resource to the application (S1009). If the two application information instances do not match, the library unit compares the acquired application information instance with an application information instance included in each of the other resource collection instances in the instance table (S1006) If there is no match, the library unit generates a new resource collection instance, and stores a combination of the acquired application information instance and the resource name of the reserved resource into the generated resource collection instance (S1007). The library unit then registers the resource collection instance to the application information instance corresponding to the application which has requested the resource (S1008), and provides the reserved resource to the application (S1009).

On the other hand, each library-unit performs the resource collection as follows. When an application is completed or suspended and an application information instance storing an application ID of the application calls a method in a registered resource collection instance, a corresponding library unit collects a resource specified by a resource name held in the resource collection instance.

Here, in a case where an application information instance includes a method for getting the status of an application (hereafter, "application status method") and a method for removing a registered resource collection instance, the resource collection is performed as follows.

Figure 14:
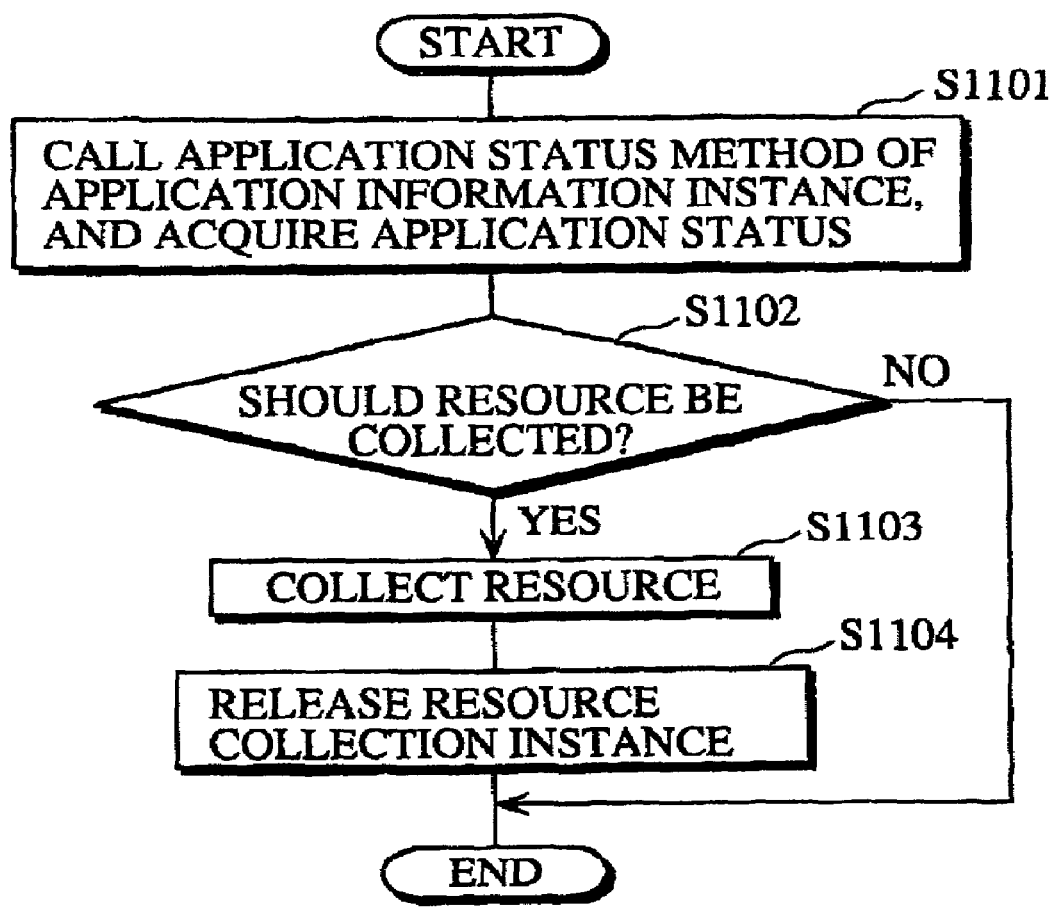
FIG. 14 is a flowchart showing a resource collecting operation of each library unit, when an application information instance includes a method for getting the status of an application and a method for removing a registered resource collection instance.

FIG. 14 is a flowchart showing a resource collection operation of each library unit when an application information instance has an application status method. When an application information instance calls a method of a registered resource collection instance, a library unit calls an application status method of the application information instance held in the resource collection instance, and acquires information showing whether an application has been completed or suspended (S1021). Based on the acquired information, the library unit judges whether resources provided to the application should be collected (S1102). If the library unit judges that the resources should be collected, the library unit collects resources corresponding to resource names held in the resource collection instance (S1103), calls a method for removing the registered resource collection instance, and executes the method to release the resource collection instance (S1104).

Note that in step S1102 the library unit may judge whether a part of the resources used by the application should be collected, instead of judging whether all resources should be collected. In this case, removing the resource collection instance in step S1104 is performed after all resources are collected.

Third Embodiment

An application execution apparatus of the third embodiment generates threads for each application, and reserves resources required by the application using the generated threads. Whenever an application is completed, an OS unit collects unwanted resources provided to the application based on a task associated with the generated threads. In this way, it is possible to execute the next application without ending the Java middleware (virtual machine). A thread mentioned here is a context (a series of steps) that sequentially executes program codes of an application. A Java application may generate a plurality of threads, which each enable program codes of the application to be executed in parallel. In this embodiment, a task is a set of threads for executing an application, and resources allocated to the application are managed in correspondence with the task.

The application execution apparatus of this embodiment is described in greater details below, with reference to the drawings.

Figure 15:
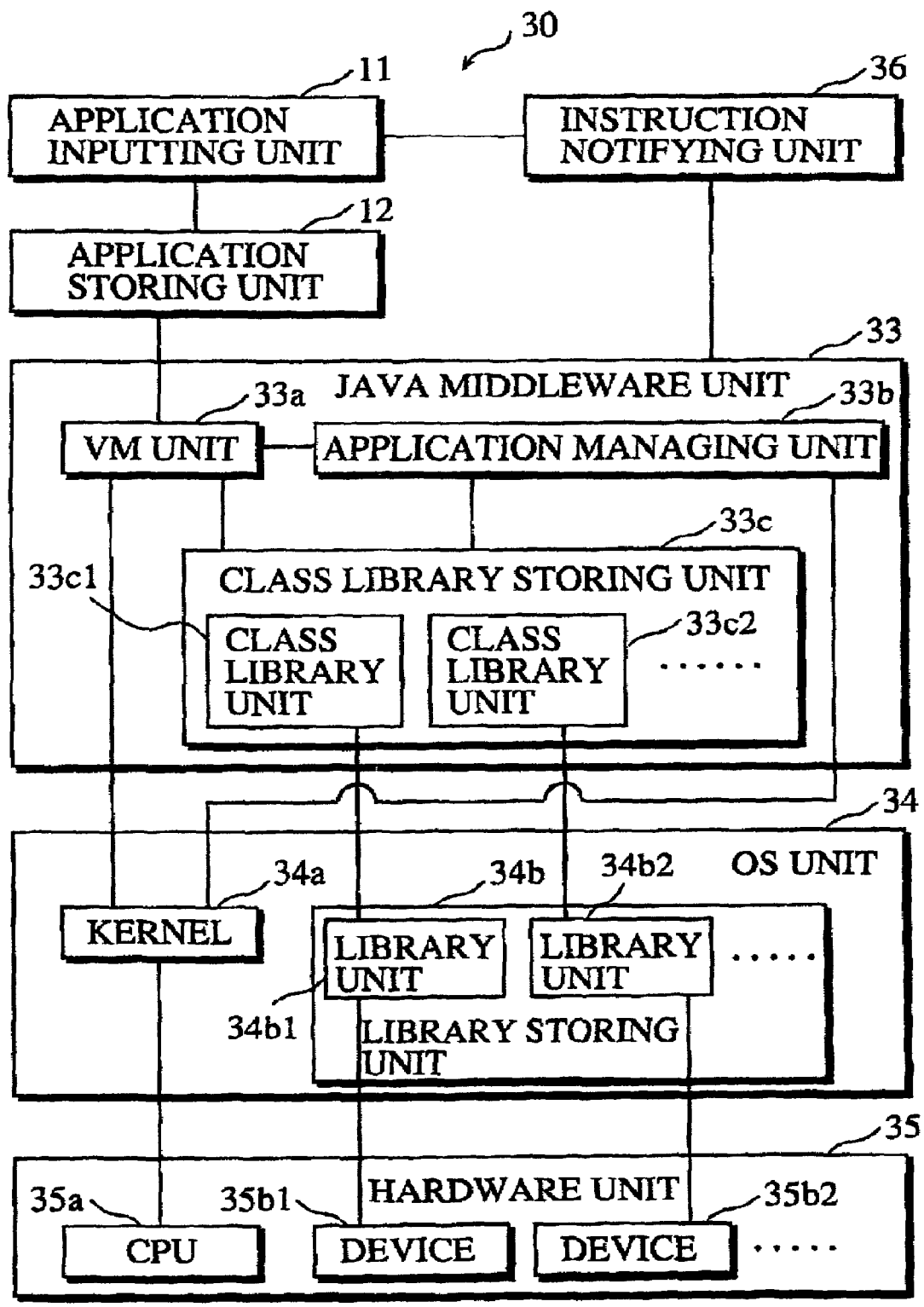
FIG. 15 is a block diagram showing a construction of an application execution apparatus according to the third embodiment of the invention.

FIG. 15 is a block diagram showing a construction of an application execution apparatus 30. The application execution apparatus 30 includes the application inputting unit 11, the application storing unit 12, a Java middleware unit 33, an OS unit 34, a hardware unit 35, and an instruction notifying unit 36.

The application inputting unit 11 and the application storing unit 12 are the same as those in the first embodiment, so that their explanation has been omitted here.

The Java middleware unit 33 includes a VM unit 33a, an application managing unit 33b, and a class library storing unit 33c, and executes an application stored in the application storing unit 12.

The VM unit 33a executes an application. Which is to say, the VM unit 33a sequentially interprets the application written in bytecode into binary codes which can be executed by a CPU 35a in the hardware unit 35, and has the CPU 35a execute the binary codes.

The VM unit 33a also reserves resources necessary for its own operation and for the execution of the application.

To be more specific, the VM unit 33a calls class library units in the class library storing unit 33c, and reserves resources necessary for its own operation via the class library units. Also, when the application which is being executed requests provision of a resource, the VM unit 33a calls a class in a corresponding class library unit in the class library storing unit 33c, and reserves the resource requested by the application via the class library unit.

Also, when the application requests deletion of a thread which is completed, the VM unit 33a has a kernel 34a in the OS unit 34 delete the thread.

The application managing unit 33b performs processes of starting an application, managing threads which are added or deleted during the execution of the application, and completing the application.

The application start process is performed as follows. The application managing unit 33b receives an instruction to start an application from the instruction notifying unit 36, and has the kernel 34a generate a task and the first thread which belongs to the task. The application managing unit 33b then has the VM unit 33a execute the application using the first thread, so as to reserve resources necessary for the operation of the VM unit 33a and start the application.

The process of managing a thread which is added or deleted during application execution is performed as follows. The application managing unit 33b holds a table showing each combination of an application, a task generated in association with the application, and threads which make up the task. Each time a thread is added or deleted in accordance with a request from an application, the application managing unit 33b updates the table so as to manage threads in association with applications and tasks. FIG. 16 shows an example of such a table. In (1), two applications are being executed, where a task with a task ID "201" made up of threads with thread IDs "1" and "2" corresponds to an application with an application ID "1", and a task with a task ID "202" made up of threads with thread IDs "4", "5", and "6" corresponds to an application with an application ID "2". In (2), a new thread with a thread ID "7" is generated during the execution of the application with the application ID "1", and the thread ID "7" is added to the table. In (3), the thread with the thread ID "5" ends during the execution of the application with the application ID "2", and the thread ID "5" is deleted from the table.

Figure 17:
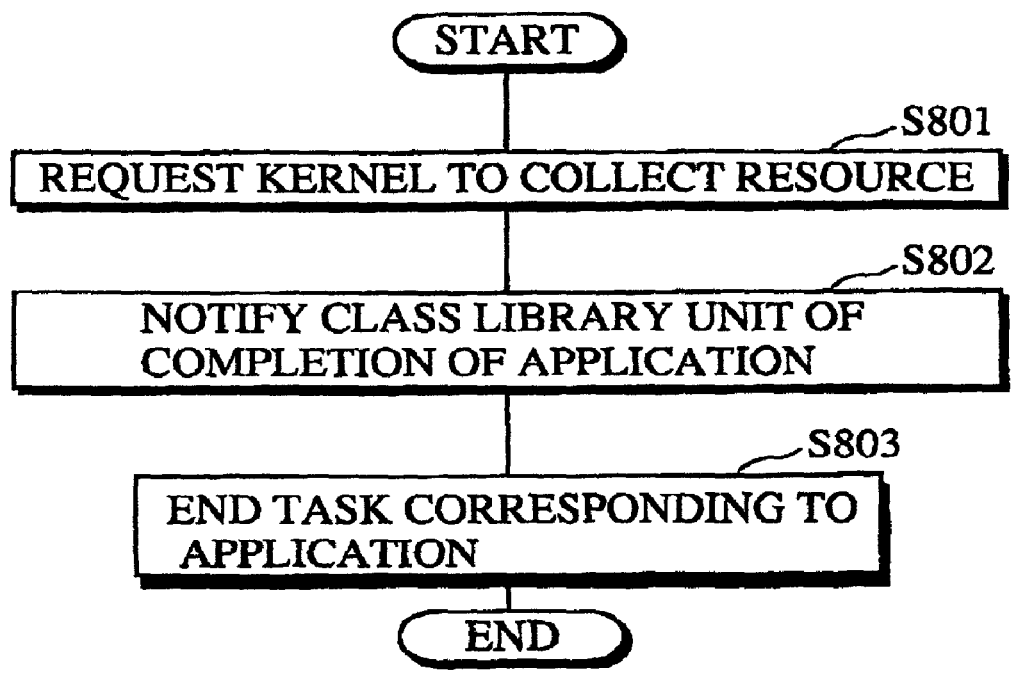
FIG. 17 is a flowchart showing an operation of an application managing unit shown in FIG. 15, when an application is completed.

Meanwhile, the application completion process is performed as follows. FIG. 17 is a flowchart showing an operation which is performed by the application managing unit 33b when an application is completed. The application managing unit 33b receives an instruction to complete an application from the instruction notifying unit 36, notifies the kernel 34a of a task ID of a task corresponding to the completed application, and requests resource collection (S801). The application managing unit 33b then notifies each class library unit in the class library storing unit 33c of an application ID of the completed application (S802), and lastly releases memory which has been reserved to generate the task corresponding to the completed application, thereby completing the task (S803). In the case of (3) in FIG. 16, for instance, when the application with the application ID "2" is completed, the application managing unit 33b notifies the kernel 34a of the task ID "202" corresponding to the application ID "2", and instructs the kernel 34a to collect the resources corresponding to the task ID "202". Following this, the application managing unit 33b notifies each class library unit of the application ID "2", and releases memory so as to end the task "2" and the threads "4" and "6" included in the task "2".

The class library storing unit 33c is made up of multiple class library units 33c1–33cn. Each class library unit controls a corresponding device in the hardware unit 35, and performs processes such as resource provision, listener management, and listener calling.

The class library storing unit 33c is realized by an ROM or a hard disk, and the device control by each class library unit is realized whereby an application calls and executes a program written in a set of classes which is a device control program.

Each class library unit performs the resource provision in the following way. When requested to provide a resource by an application executed by the VM unit 33a, a class library unit calls a corresponding library unit in the OS unit 34, and provides the resource.

Also, each class library unit performs the listener management in the following way. When called by an application executed by the VM unit 33a and accepting registration of a listener, a class library unit generates a thread (hereafter, "special thread") for calling the registered listener. This special thread generation by the class library unit is executed in a thread which is executing the application. The class library unit generates the special thread for calling the listener, as a thread which belongs to a task corresponding to the application.

Here, a listener is a class or an interface which waits to be informed of the occurrence of an event (a change of the status of a device caused, for example, by a remote control input operation by a user or a disconnection of a modem). A method that is called upon the occurrence of the event is defined in the listener, and the event is handled by calling and executing the method. The registered listener is called when the event occurs. For example, when an event such as a remote control input operation by a user occurs, the method defined in the registered listener is called, and the event is handled by executing the called method.

The listener registration means that an application requests a class library unit which monitors an event to notify, when the event occurs, of the occurrence of the event. This notification is made whereby the class library unit calls a method which is defined in the listener when registering the listener.

When a listener is registered, a class library unit calls the application managing unit 33b and acquires an application ID of an application which registers the listener. The application managing unit 33b specifies the application ID and provides it to the class library unit, in the following manner. The application managing unit 33b acquires an instance of a thread class which has called the application managing unit 33b, and specifies an ID (thread ID) of the instance which has called the application managing unit 33b, through the use of a function "hashcode" that is a method for retrieving a hashcode value from the instance. The application managing unit 33b then specifies an application ID corresponding to the thread ID, with reference to a table that shows the correspondence between application IDs and thread IDs. The application managing unit 33b provides the specified application ID to the class library unit. The hashcode value retrieved here is an ID assigned to each instance so that the VM unit 33a can efficiently manage instances generated from classes. The class library unit stores a combination of the application ID provided from the application managing unit 33b, the thread ID of the generated special thread, and the listener ID of the registered listener, in a table.

Figure 18:
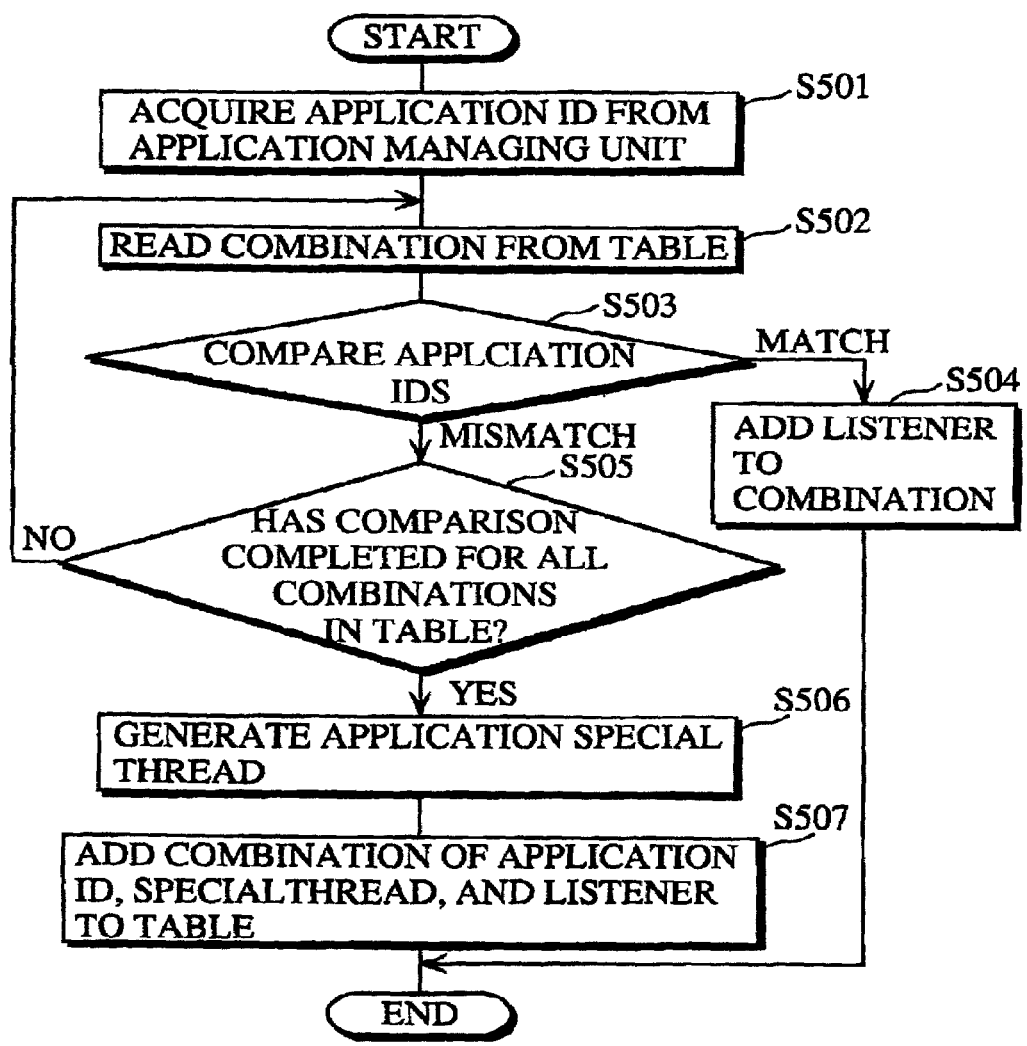
FIG. 18 is a flowchart showing a listener managing operation of each class library unit shown in FIG. 15.

FIG. 18 is a flowchart showing a listener managing operation performed by each class library unit.

When called by an application executed by the VM unit 33a for listener registration, a class library unit calls the application managing unit 33b, and acquires an application ID of the application which registers the listener (S501). The class library unit then reads a combination of an application ID, a special thread, and a listener from a table of correspondence between registered listeners, special threads, and application IDs (S502), and compares the acquired application ID with the read application ID (S503).

When the two application IDs match, the class library unit adds the newly registered listener to the table in association with the application ID (S504). When the two application IDs do not match, the class library unit reads the next combination from the table, and repeats the comparison. When the comparison has been completed for all combinations in the table without finding any match (S505), the class library unit generates a special thread corresponding to the newly registered listener (S506), and adds a combination of the acquired application ID, the generated special thread, and the newly registered listener, to the table (S507).

In this way, when an application with an application ID held in the table performs listener registration a plurality of times, a special thread corresponding to the application can be specified in the table, and a plurality of listeners registered by the application can be held together in the table in association with the specified special thread. Since the plurality of listeners can be called from the special thread, it becomes unnecessary to generate the special thread each time a listener is registered by the application, with it being possible to reduce the number of generated threads.

FIG. 19 shows an example of a table held in a class library unit. In (1), an application with an application ID "1" registers listeners "L1" and "L4", and a special thread "theard10" corresponding to these listeners is generated. In (2), a listener "L6" is newly registered and as a result the table is updated. Specifically, when the listener "L6" is registered, the class library unit calls the application managing unit 33b, and acquires an application ID ("2") of an application which has registered the listener. The class library unit then compares the acquired application ID with the application ID "1" in the table. Upon judging that the two application IDs do not match, the class library unit generates a new special thread, and stores a combination of the generated special thread "theard20", the application ID "2", and the listener "L6" in the table. In (3), the application with the application ID "1", is completed, and the application ID "1", the special thread "theard10", and the listeners "L1" and "L4" are deleted from the table.

Figure 20:
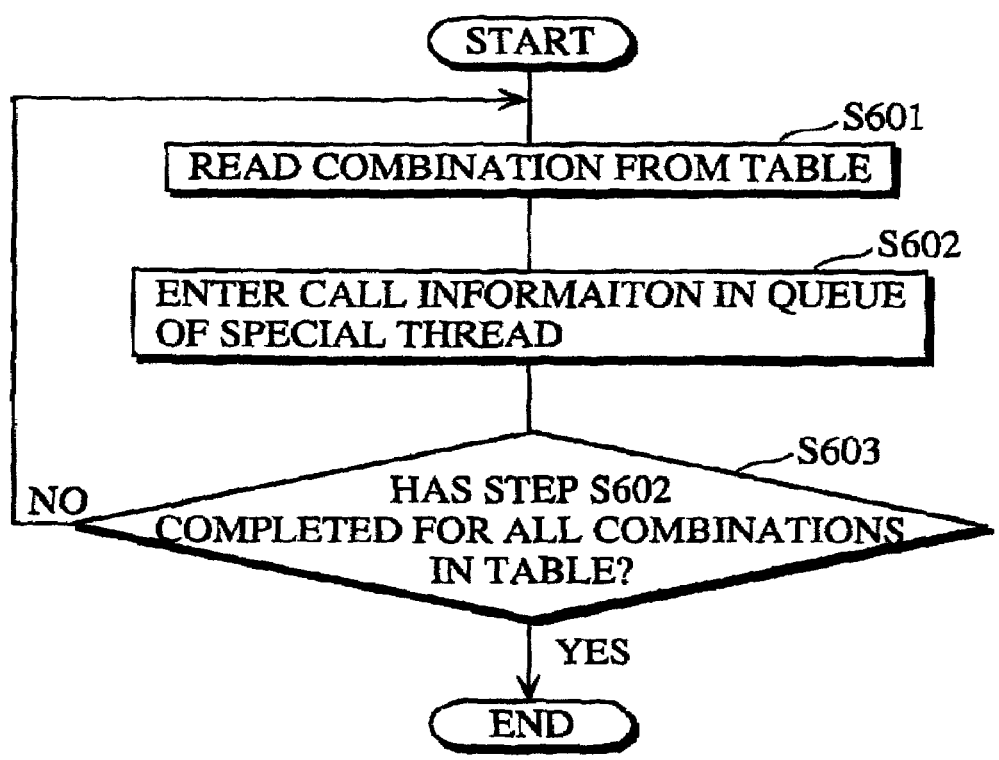
FIG. 20 is a flowchart showing an operation of notifying of the occurrence of an event.

The following is an explanation on a procedure which is performed from when an event occurs to when a class library unit calls a registered listener from a special thread. This procedure can be divided into two processes. The first process is to notify of the occurrence of the event, which is executed by a thread generated in the OS unit 34. FIG. 20 is a flowchart showing an operation of notifying of the occurrence of an event. When notified by a library unit in the library storing unit 34b in the OS unit 34 of the occurrence of an event, a class library unit reads a combination of an application ID, a special thread, and a registered listener from a table held therein (S601), and stores call information which is necessary to call the listener, in a queue of the read special thread (S602). Here, the queue conducts information transfer between threads, and is capable of two operations that are "storing a piece of information" and "retrieving a piece of information". The class library unit performs the same process for all combinations in the table (S603).

Figure 21:
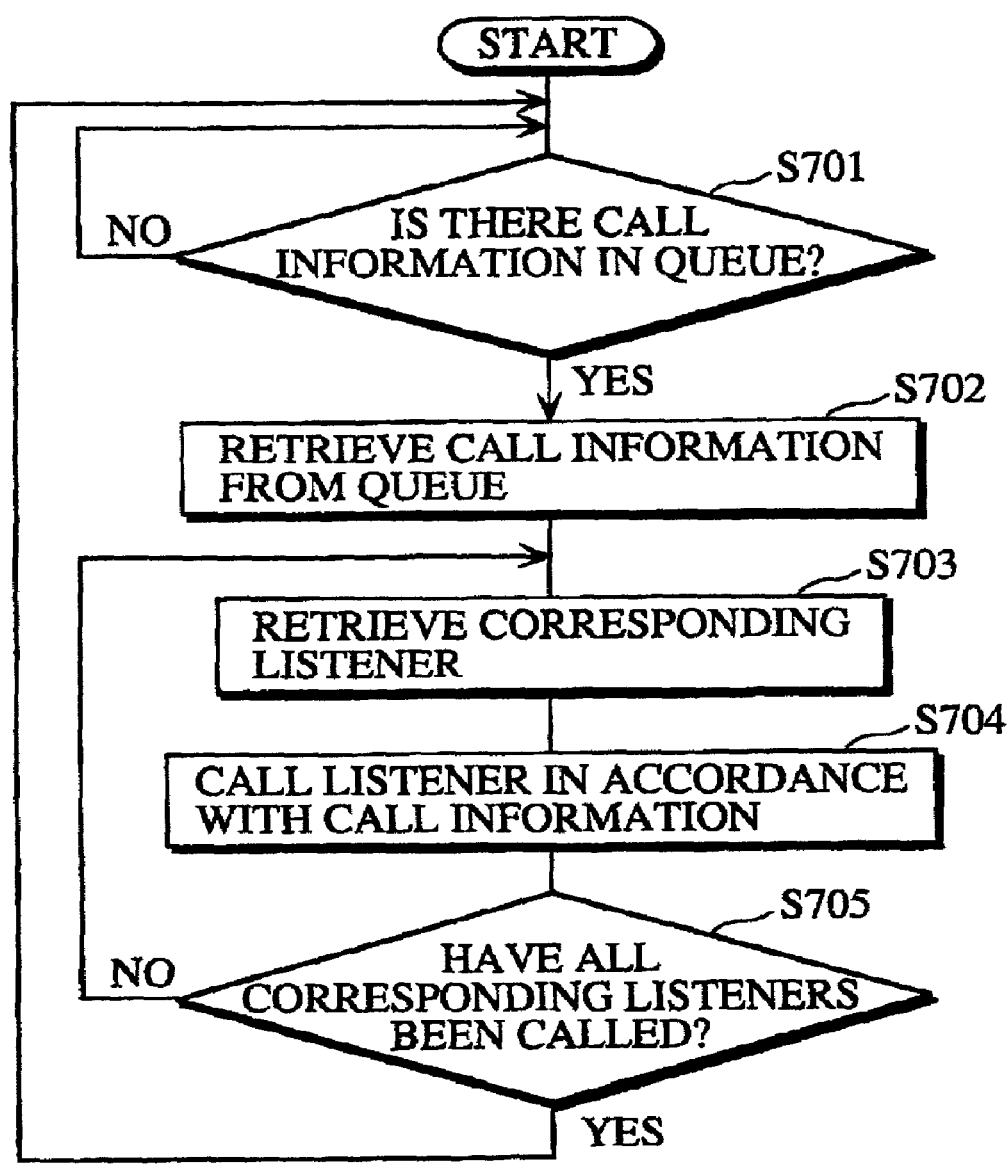
FIG. 21 is a flowchart showing a listener calling operation of each class library unit.

The second process is to call the registered listener, which is executed by the special thread generated by the class library unit. FIG. 21 is a flowchart showing a listener calling operation. The class library unit monitors whether the call information is held in the queue, by executing the special thread (S701). If there is the call information in the queue, the class library unit retrieves the call information (S702), specifies a listener corresponding to the special thread in the table (S703), and calls the listener (S704). When there are a plurality of listeners corresponding to the special thread, steps S703 and S704 are performed for all corresponding listeners (S705).

Figure 22:
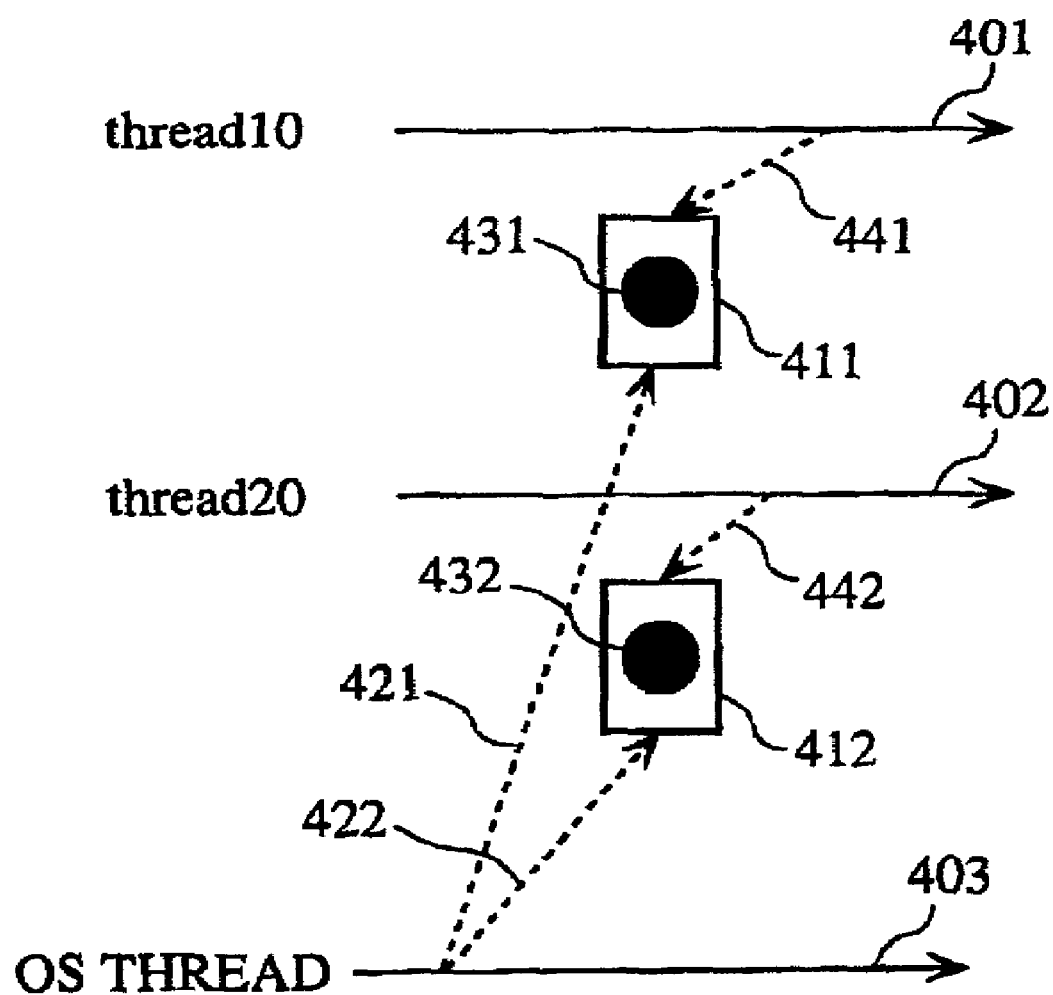
FIG. 22 is a schematic view showing an example procedure of calling a listener from a special thread using a queue.

FIG. 22 is a schematic view showing an example procedure of calling a listener from a special thread using a queue.

In the drawing, numerals 411 and 412 show queues provided respectively for the special threads "theard10" and "theard20" in FIG. 19. Numerals 401 and 402 show the special threads "theard10" and "theard20", while numeral 403 shows a thread generated in the OS unit 34 for a library unit in the library storing unit 34b to notify of the occurrence of an event. Broken lines 421 and 422 indicate to hold information, black circles 431 and 432 show the held information, and broken lines 441 and 442 indicate to retrieve the held information.

When notified by a library unit of the occurrence of an event using the thread 403, a class library unit stores the information 431 and 432 necessary for listener calling in the queue 411 and 412 (421 and 422). The special threads 401 and 402 monitor whether information is held in the queues 411 and 412. If the information is held in the queues 411 and 412, the special threads 401 and 402 retrieve the information and call corresponding listeners. Which is to say, the special thread 401 calls the listeners "L1" and "L4", whereas the special thread 402 calls the listener "L6".

The OS unit 34 includes the kernel 34a and the library storing unit 34b, and indirectly executes an application by operating the Java middleware unit 33.

The kernel 34a manages resources provided to applications, in units of tasks corresponding to the applications. Specifically, the kernel 34a generates a task corresponding to an application and the first thread of the task in response to an instruction from the application managing unit 33b, and reserves resources necessary for the operation of the VM unit 33a using the first thread. The kernel 34a also generates threads required by the application, provides resources required by the application using the generated threads, and holds resource names of the provided resources and a task ID of a task to which the threads belong, in correspondence. When notified by the application managing unit 33a of a task ID corresponding to an application which is completed, the kernel 34a collects all resources specified by resource names held in correspondence with the notified-task ID.

The library storing unit 34b is made up of multiple library units 34b1–34bn each for controlling a corresponding device in the hardware unit 35 (e.g. the library unit 34b1 controls a device 35b1, and the library unit 34b2 controls a device 35b2). The library storing unit 34 is implemented by an ROM or a hard disk, and the device control by each library unit is realized whereby a class of a class library unit calls and executes a program describing a set of functions for device control.

The hardware unit 35 includes the CPU 35a for operating the OS unit 34 and the Java middleware unit 33, and devices 35b1–35bn.

The CPU 35a executes program codes of an application, by executing threads generated by the kernel 34a. The devices 35b1–35bn include a memory device, a display device, an input device (such as a keyboard and a remote control), a file system, a network device, and so on. Each device operates in accordance with the control which is exercised by an application via a class library unit and a library unit.

The instruction notifying unit 36 instructs the application managing unit 33b to start an application and to complete an application. More specifically, the instruction notifying unit 36 instructs the application managing unit 33b to start an application, and upon receiving an application completion instruction from the outside, instructs the application managing unit 33b to complete the application.

The above embodiment describes the case where the class library unit has the special thread constantly monitor whether the call information is held in the queue in step S701 in FIG. 21. However, the class library unit may put the special thread in a wait state, wake the special thread when the call information is held in the queue, and have the special thread perform steps S702–S705. As a result, resources can be utilized efficiently.

Also, steps S801 and S802 in FIG. 17 may be performed in reverse order. Further, the number of threads generated for each application is not limited to the example shown in FIG. 16. It is possible to generate the special threads for all listeners.

The above embodiment describes the case where the resource management is performed by the kernel 34a, but the resource management may be performed by each library unit in the library storing unit 34b. In such a case, when providing a resource, a library unit inquires about a task provided with the resource, to the kernel 34a. Upon receiving a task ID of the task from the kernel 34a, the library unit holds a combination of the task ID and a resource name of the provided resource in a table. When instructed by the kernel 34a to collect a resource corresponding to a specific task, the library unit specifies a-resource name corresponding to a task ID of the specific task in the table, and collects the resource specified by the resource name.

Figure 23:
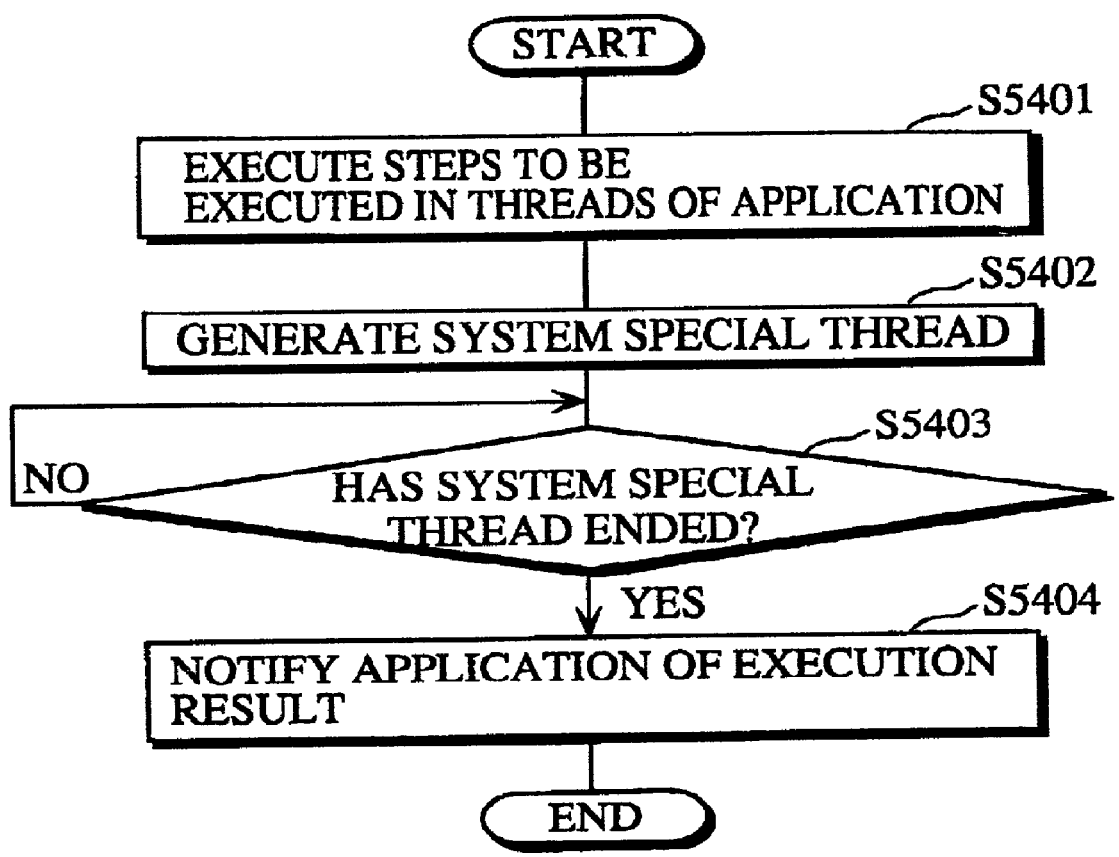
FIG. 23 is a flowchart showing an operation of acquiring a system special thread by a VM unit shown in FIG. 15.

The above embodiment describes the case where the VM unit 33*a* reserves resources necessary for its operation by executing the first thread which belongs to a task executing an application. However, the VM unit 33*a* may have a class library unit generate a system special thread independent of the threads that execute the application, and reserve the necessary resources using the system special thread. An operation of each class library unit in this case is explained with reference to FIG. 23. FIG. 23 is a flowchart showing an operation of acquiring a system special thread by the VM unit 33*a*. A class library unit executes necessary steps in threads which execute an application (e.g. provision of resources necessary for the application) (S5401), generates a system special thread (S5402), and executes necessary steps in the system special thread (e.g. provision of resources necessary for the VM unit 33*a*) (S5403). On completing the steps, the class library unit notifies the application of the execution result (S5404). The steps executed in the threads for the application and the steps executed in the system special thread for the system such as the VM unit 33*a* may be alternately repeated a predetermined number of times, or may be repeated in parallel. Also, the notification in step S5404 may be omitted.

As a result, the resources necessary for the VM unit 33*a* are reserved using the system special thread, so that even when one application ends, the VM unit 33*a* can execute the next application without reacquiring the necessary resources. Also, each class library unit may reserve resources necessary for its own operation using the system special thread. For example, memory for holding the table showing the correspondence between applications, threads, and listeners shown in FIG. 19 may be reserved using the system special thread.

The above embodiment describes the case where each class library unit generates a special thread, but each class library unit may generate a call thread for calling a method "paint" defined in a class "Component" when generating an instance "Component" from the class "Component" that provides the function of painting on a screen during application execution. Also, the special thread generation by a class library unit for the listener registration by an application may be completed when an application is started.

In so doing, it becomes unnecessary for each class library unit to check the presence or absence of a special thread each time a listener is registered, with it being possible to complete the listener registration in a short time.

Fourth Embodiment

In an application execution apparatus of the fourth embodiment, whenever an application is completed or suspended, each library unit collects a resource provided to the application.

More specifically, when requested to provide a resource by an application via a class library unit, a library unit provides the requested resource, acquires an application ID of the application which has requested the resource, and holds a combination of the acquired application ID and a resource name of the provided resource in a table. When notified by a kernel 44*a* of an application ID of an application which is completed, the library unit detects a resource name corresponding to the notified application ID in the table, and collects a resource specified by the detected resource name.

Figure 24:
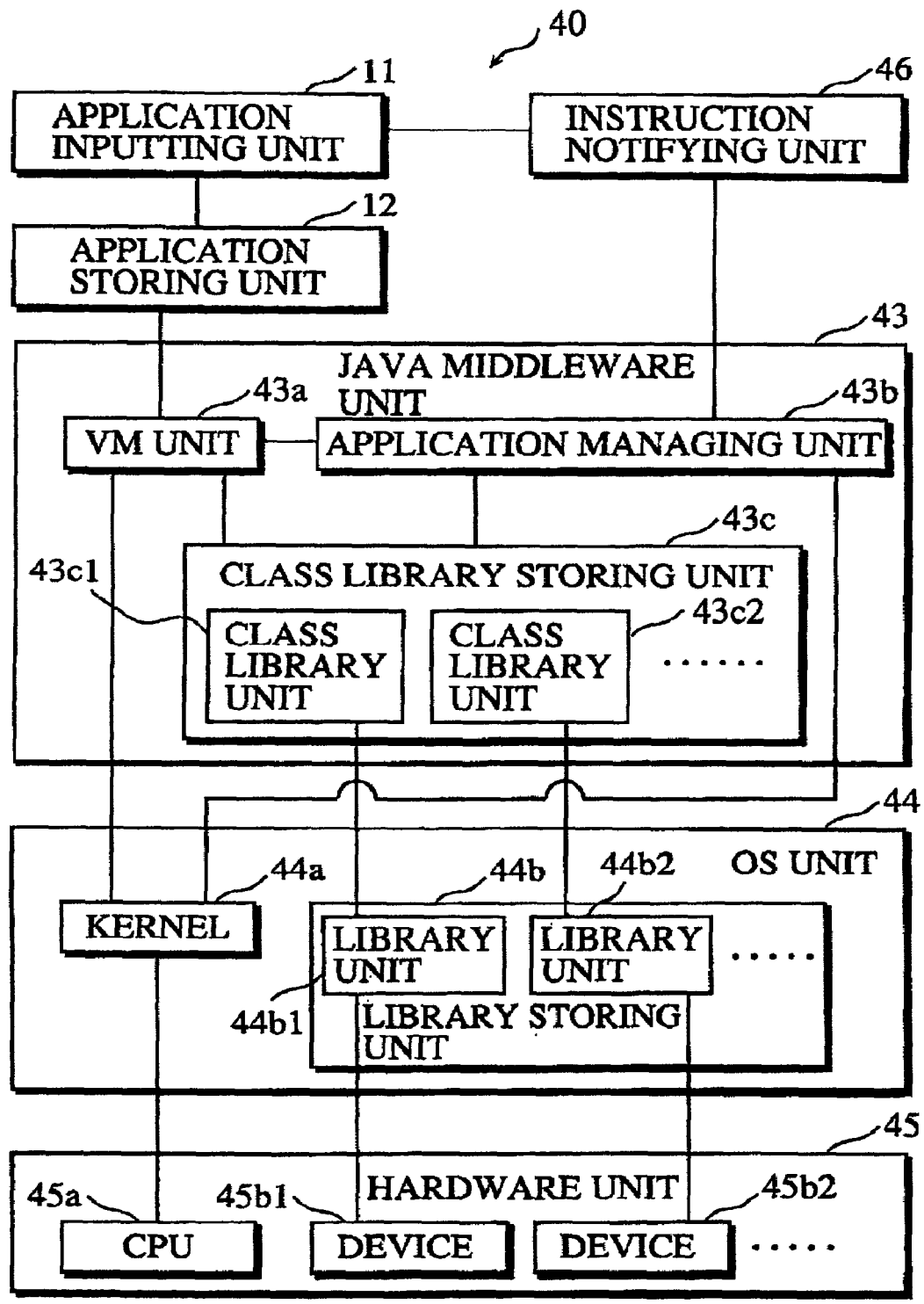
FIG. 24 is a block diagram showing a construction of an application execution apparatus according to the fourth embodiment of the invention.

The application execution apparatus of this embodiment is explained below with reference to the drawings. FIG. 24 is a block diagram showing a construction of an application execution apparatus 40.

The application execution apparatus 40 includes the application inputting unit 11, the application storing unit 12, a Java middleware unit 43, an OS unit 44, a hardware unit 45, and an instruction notifying unit 46.

The application inputting unit 11 and the application storing unit 12 are the same as those in the first embodiment, so that their explanation has been omitted here.

The Java middleware unit 43 includes a VM unit 43*a*, an application managing unit 43*b*, and a class library storing unit 43*c*, and executes an application stored in the application storing unit 12.

The VM unit 43*a* loads an application from the application storing unit 12, sequentially analyzes bytecodes of the application, and executes the application.

The application managing unit 43*b* performs processes of starting an application to be executed by the VM unit 43*a*, managing the application being executed, and completing the application.

The application start process is performed as follows. The application managing unit 43*b* generates an instance of a class loader for each application, and loads all class files which compose the application using the class loader instance. Here, a class loader is a class for reading a class file used in a Java program into memory.

Figures 25, 26, 27:
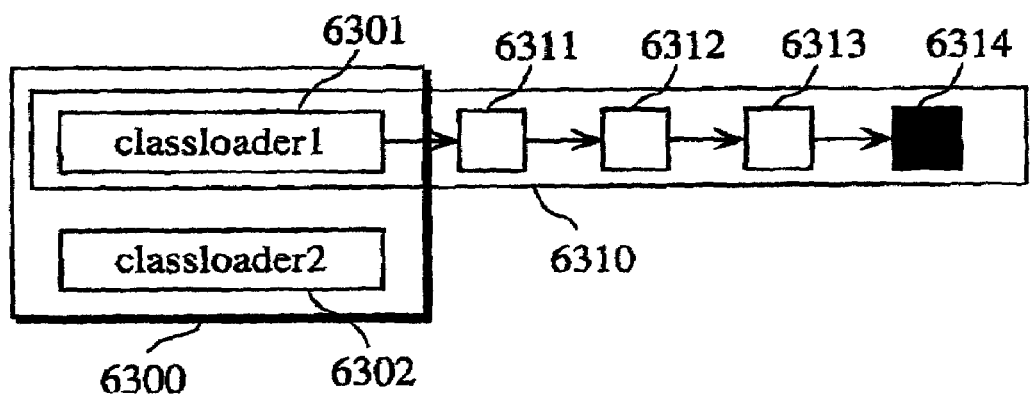
FIG. 25 shows a table of correspondence between class loader instances and application IDs, held in an application managing unit shown in FIG. 24.
FIG. 26 is a schematic view showing the relation between a stack and class loader instances generated by the application managing unit.
FIG. 27 shows a table of correspondence between application IDs and resource names of provided resources.

The application management process is performed as follows. The application managing unit 43*b* holds a table showing each combination of an application ID of an application which is started and an instance of a class loader for loading class files that form the application, Here, the kernel 44*a* in the OS unit 44 gives a unique application ID to each application which is started by the application managing unit 43*b*. FIG. 25 shows an example of a table of correspondence between class loader instances and application IDs, in the application managing unit 43*b*.

The application completion process is performed as follows. The application managing unit 43*b* receives an application completion instruction from the instruction notifying unit 46, and notifies the kernel 44*a* and class library units in the class library storing unit 43*c* which have provided resources to the application, of an application ID of the application to be completed.

Further, when requested to notify of an application ID of the application by a class library unit which has provided a resource to the application, the application managing unit 43*b* specifies the application ID and notifies the class library unit of the application ID, in the following manner.

Here, the application managing unit 43*b* refers to a stack which stores class call information, acquires an instance of a class loader which has loaded the application, specifies an application ID corresponding to the acquired class loader instance in the table held therein, and notifies the class library unit of the application ID. The stack is a memory area provided as a work area for methods of classes. Each time a class is called by calling a method, the called class is assigned a work area in the stack, and the classes with call information are sequentially stored in the stack. The call information includes information for specifying the caller of the method.

The procedure of specifying an application ID is explained in more details below, using a specific example.

FIG. 26 is a schematic view showing the relation between class loader instances generated by the application managing unit 43*b* and a stack. In this example, a class loader instance 6301 calls a method of a class A of an application, the called class A calls a method of another class B of the application, and the called class B calls another class C of the application. Lastly, the class C calls a method of a class D in a class library unit, to-request reservation of a resource. This being so, each time a class is called, the called class is assigned a work area in the stack, and call information is stored in the work area. Numeral 6300 is a storage location of class loaders managed by the application managing unit 43a, where the two class loaders 6301 and 6302 are stored. Numeral 6310 is a stack, and numerals 6311–6314 are call information held in the classes A–D stored in the stack 6310. When requested to specify an application ID by a class library unit which is called by the class D, the application managing unit 43b refers to the call information 6314–6311 in the stack 6310 in sequence, to acquire the class loader instance 6301 which has loaded the application. The application managing unit 43b then refers to the held table, and specifies an application ID corresponding to the acquired class loader instance.

The class library storing unit 43c is made up of multiple class library units 43c1–43cn. Each class library unit controls a device in the hardware unit 45, through a corresponding library unit in the library storing unit 44b.

The class library storing unit 43c is implemented by an ROM or a hard disk, and the device control by each class library unit is realized whereby an application calls and executes a program written in a set of classes which is a device control program.

When requested to provide a resource by an application, a class library unit calls a corresponding library unit in the library storing unit 44b, and provides the requested resource to the application. The class library unit also acquires an application ID of the application from the application managing unit 43b, and gives the acquired application ID to the library unit.

The kernel 44a is notified by the application managing unit 43b of completion of an application and an application ID of the completed application, notifies the application ID to each library unit which has provided a resource to the application, and has each library unit collect the resource.

The library storing unit 44b is made up of multiple library units 44b1–44bn for controlling devices. Each library unit controls a corresponding device in the hardware unit 45 (e.g. the library unit 44b1 controls a device 45b1, and the library unit 44b2 controls a device 45b2).

The library storing unit 44b is implemented by an ROM or a hard disk, and the device control by each library unit is realized whereby a class of a class library unit calls and executes a program describing a set of functions for device control.

More specifically, each library unit provides a resource to an application in accordance with a call from a class library unit, and receives an application ID of the application from the class library unit. The library unit then stores a combination of the application ID and a resource name of the provided resource in a table. When notified by the kernel 44a of an application ID of an application which is completed, the library unit detects a resource name corresponding to the notified application ID in the table, and collects a resource specified by the detected resource name. FIG. 27 shows an example of a table showing combinations of application IDs and resource names of provided resources. The drawing shows that a library unit has provided resources (files) to two applications.

The above embodiment describes the case where each library unit holds a table listing combinations of application IDs and resource names of provided resources, but the kernel 44a may hold such a table.

Also, the kernel 44a generates application IDs in the above embodiment. In so doing, even when a plurality of middleware operate at the same time, an overlap of IDs which may occur when two middleware generate IDs independently of each other can be avoided, and resources can be properly managed by the kernel 44a.

Fifth Embodiment

Figure 28:
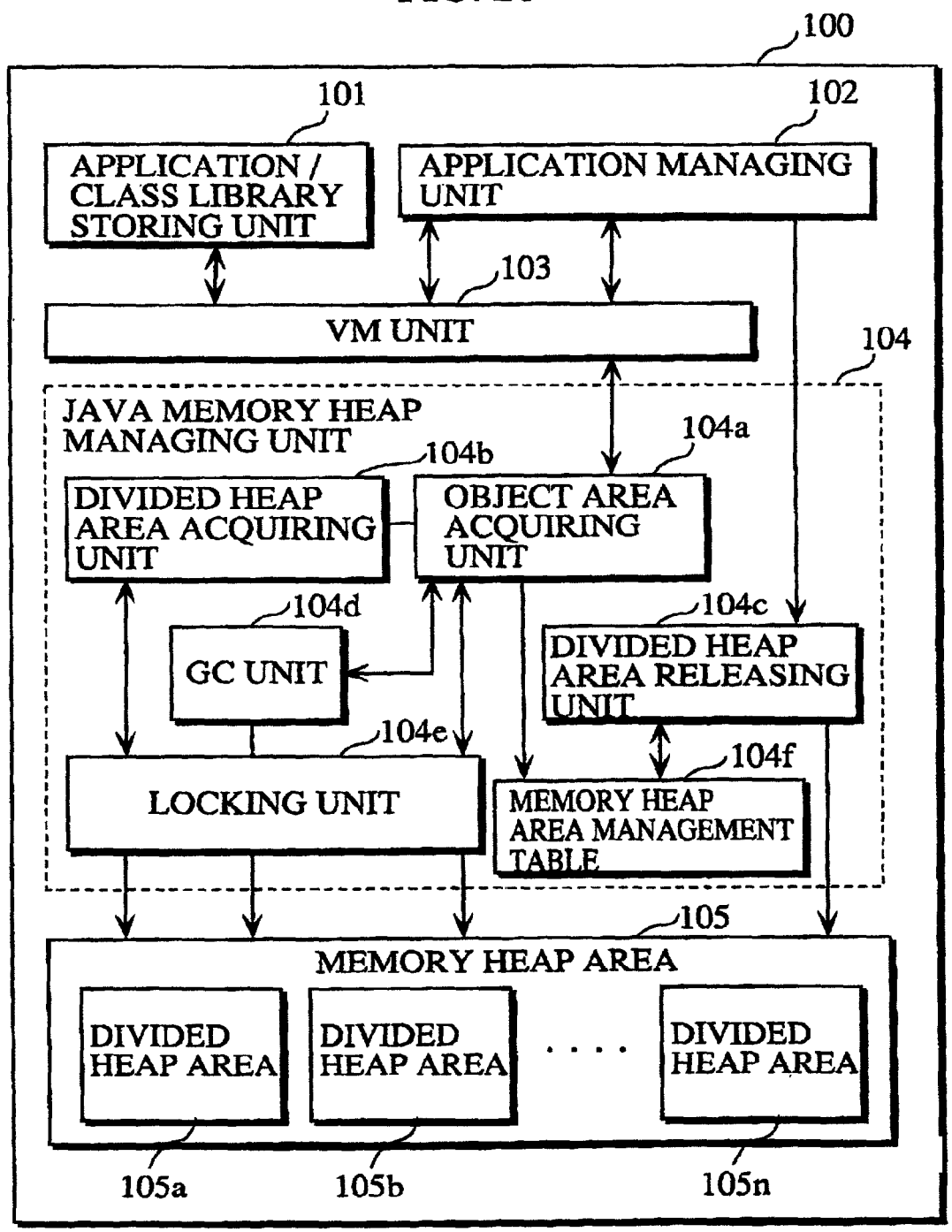
FIG. 28 is a block diagram showing a construction of an application execution apparatus according to the fifth embodiment of the invention.

FIG. 28 is a block diagram showing a construction of an application execution apparatus 100 to which the fifth embodiment of the invention relates. The application execution apparatus 100 includes an application/class library storing unit 101, an application managing unit 102, a VM unit 103, a memory heap managing unit 104, and a memory 105. The memory heap managing unit 104 includes an object area acquiring unit 104a, a divided heap area acquiring unit 104b, a divided heap area releasing unit 104c, a GC unit 104d, a locking unit 104e, and a memory heap area management table 104f.

The memory 105 has a memory heap area including a plurality of divided heap areas 105a–105n. Each divided heap area is provided to one application, as an area for storing objects relating to the application. Here, the reason why a divided heap area is provided for each application is to perform garbage collection not on the entire memory heap area but on each divided heap area individually. In addition, by providing a divided heap area for each application, it is possible to release a whole divided heap area when an application ends.

The application/class library storing unit 101 stores a plurality of applications and an existing class library.

The application managing unit 102 receives an application start instruction and an application completion instruction from the outside, and instructs the VM unit 103 to start and complete an application. Also, when an application is completed, the application managing unit 102 instructs the divided heap area releasing unit 104c to release a divided heap area which stores objects relating to the application.

The VM unit 103 is instructed by the application managing unit 102 to start an application, and has the memory heap managing unit 104 allocate a divided heap area to the application. The VM unit 103 then loads the application from the application/class library storing unit 101 into the allocated divided heap area, and executes the loaded application.

Here, the procedure of loading an application can be divided into the first process of loading a class loader object and the second process of loading individual objects relating to the application.

First, the class loader object is loaded as follows. As the application start instruction, the VM unit 103 receives from the application managing unit 102 an instruction to generate the class loader object for the application. The VM unit 103 accordingly outputs an instruction to acquire an object area for the class loader object (hereafter "first acquisition instruction"), to the object area acquiring unit 104a. A class loader object referred to here is an object for loading objects relating to an application from the application/class library storing unit 101 into a divided heap area.

The VM unit 103 receives the allocation of the divided heap area and the allocation of the object area from the object area acquiring unit 104a in response to the first acquisition instruction, loads the class loader object from the application/class library storing unit 101 into the object area in the divided heap area, and executes the class loader object;

Next, the individual objects relating to the application is loaded as follows.

By executing the class loader object, the VM unit 103 loads the individual objects relating to the application from the application/class library storing unit 101 into object areas allocated by the object area acquiring unit 104*a*. In other words, the VM unit 103 outputs an instruction to acquire an object area for each object relating to the application (hereafter "second acquisition instruction"), to the object area acquiring unit 104*a*. Upon receiving the allocation of the object area from the object area acquiring unit 104*a* in response to the second acquisition instruction, the VM unit 103 loads the object from the application/class library storing unit 101 into the object area, and executes the object. Note here that the second acquisition instruction is an instruction to acquire an object area for an object other than a class loader object, and is outputted from the VM unit 103 when an application which is being executed requests generation of another object.

The object area acquiring unit 104*a* instructs, upon receiving the first acquisition information from the VM unit 103, the divided heap area acquiring unit 104*b* to acquire a divided heap area. When receiving the allocation of the divided heap area, the object area acquiring unit 104*a* acquires a class loader object area in the divided heap area, and notifies the VM unit 103 of the class loader object area.

Figure 29:
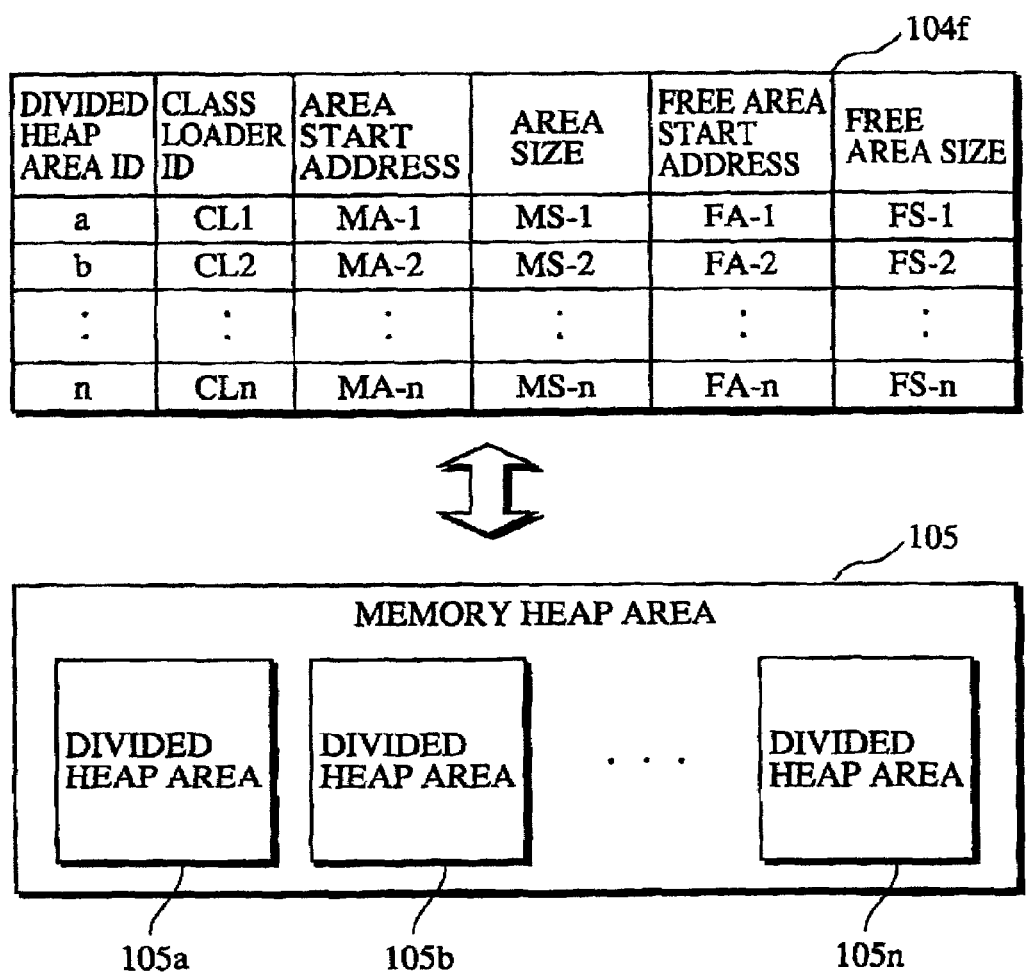
FIG. 29 shows the state of a memory heap area management table and a memory heap area shown in FIG. 28.

The memory heap area management table 104*f* includes information (hereafter, "divided heap area information") about divided heap areas acquired by the divided heap area acquiring unit 104*b*. As shown in FIG. 29, divided heap area information is made up of an ID of a divided heap area, an ID of a class loader object loaded in the divided heap area, a start address of the divided heap area, a size of the divided heap area, a start address of a free area which is unoccupied in the divided heap area, and a size of the free area. Registration of new divided heap area information in the memory heap area management table 104*f* is done by the divided heap area acquiring unit 104*b*, when the divided heap area acquiring unit 104*b* acquires a divided heap area in according with an instruction from the object area acquiring unit 104*a*. In this divided heap area information, the information about the start address and size of the free area is renewed each time the object area acquiring unit 104*a* acquires an object area in response to the first or second acquisition instruction from the VM unit 103. Also, when an application is completed and the divided heap area releasing unit 104*c* releases a divided heap area allocated to the completed application in accordance with an instruction from the application managing unit 102, divided heap area information which relates to the released divided heap area is deleted from the memory heap area management table 104*f*.

Also, upon receiving the second acquisition instruction from the VM unit 103, the object area acquiring unit 104*a* specifies a class loader object for loading an application for which the second acquisition instruction has been made, and specifies a divided heap area corresponding to the class loader object, by referring to the memory heap area management table 104*f* (for example, a divided heap area b is specified when a class loader CL2 is specified). The object area acquiring unit 104*a* then tries to acquire an object area in the specified divided heap area. If the object area can be acquired in the divided heap area, the object area acquiring unit 104*a* notifies the VM unit 103 of the object area, and renews divided heap area information (the free area start address and the free area size) of the divided heap area in the memory heap area management table 104*f*.

If the object area cannot be acquired in the divided heap area, the object area acquiring unit 104*a* instructs the GC unit 104*d* to perform garbage collection on the divided heap area, and retries to acquire the object area after the garbage collection.

The divided heap area acquiring unit 104*b* receives a divided heap area acquisition instruction from the object area acquiring unit 104*a*, and acquires a divided heap area in the memory heap area. The divided heap area acquiring unit 104*b* then registers a combination of an ID of a class loader object and information about the divided heap area, into the heap memory area management table 104*f*.

The divided heap area releasing unit 104*c* specifies, when instructed by the application managing unit 102 to release a divided heap area as a result of completion of an application, a divided heap area corresponding to a class loader object which has loaded the application, in the memory heap area management table 104*f*. The divided heap area releasing unit 104*c* then releases the divided heap area, and deletes divided heap area information about the divided-heap area (i.e. the divided heap area ID, the class loader object ID, the divided heap area start address, the divided heap area size, the free area start address, and the free area size) from the memory heap area management table 104*f*.

The GC unit 104*d* performs garbage collection on a divided heap area, when instructed by the object area acquiring unit 104*a*.

The locking unit 104*e* suspends, while the GC unit 104*d* is garbage-collecting a divided heap area, the execution of an application which uses the divided heap area.

Figure 30:
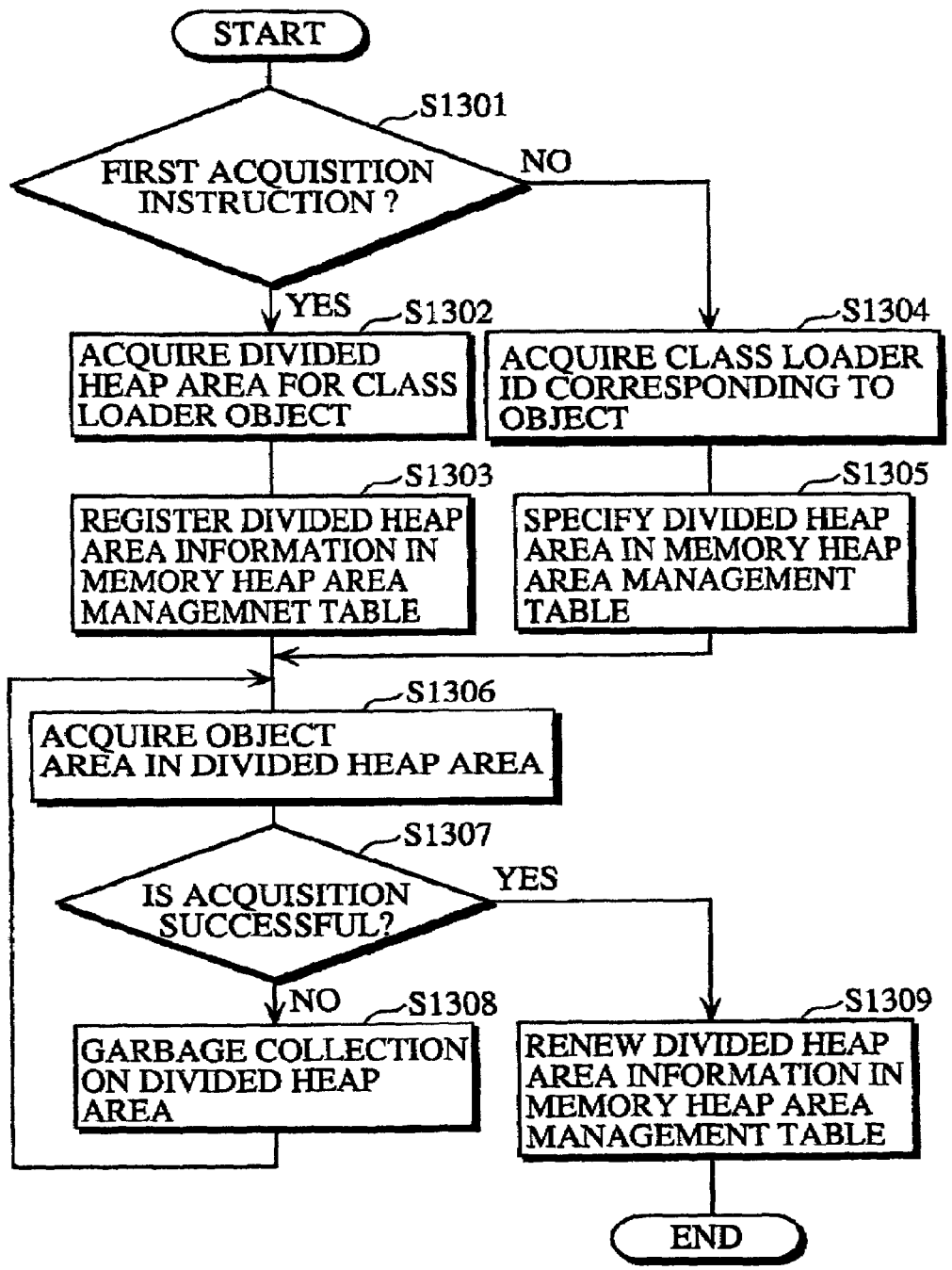
FIG. 30 is a flowchart showing an operation of acquiring an object area after an object area acquisition instruction is issued from a VM unit.

FIG. 30 is a flowchart showing an object area acquiring operation of the memory heap managing unit 104, upon receiving an object area acquisition instruction (the first or second acquisition instruction) from the VM unit 103.

The object area acquiring unit 104*a* judges whether the object area acquisition instruction from the VM unit 103 is the first acquisition instruction (for a class loader object) or the second acquisition instruction (for an object other than a class loader object) (S1301) When the object area acquisition instruction is the first acquisition instruction, the object area acquiring unit 104*a* instructs the divided heap area acquiring unit 104*b* to acquire a divided heap area for the class loader object, and the divided heap area acquiring unit 104*b* accordingly acquires the divided heap area in the memory 105 (S1302). The divided heap area acquiring unit 104*b* registers a combination of an ID of the class loader object and information about the acquired divided heap area into the memory-heap area management table 104*f*, as shown in FIG. 29 (S1303). Following this, the object area acquiring unit 104*a* acquires an object area for the class loader object in the divided heap area acquired by the divided heap area acquiring unit 104*b* (S1306, S1307), and renews the corresponding divided heap area information in the memory heap area management table 104*f* (S1309).

If the object area acquisition instruction is the second acquisition instruction, on the other hand, the object area acquiring unit 104*a* acquires a class loader ID held by the object from the VM unit 103 (S1304), and specifies a divided heap area corresponding to the class loader ID in the memory heap area management table 104*f* (S1305). After this, the object area acquiring unit 104*a* acquires an object-area in the divided heap area (S1306). The object area acquiring unit 104*a* judges whether the acquisition of the object area is successful (S1307).

If the acquisition is successful, the object area acquiring unit 104a renews the divided heap area information for the divided heap area in the memory heap area management table 104f (S1309).

If the acquisition is not successful, the object area acquiring unit 104a instructs the GC unit 104d to perform garbage collection on the divided heap area, and the GC unit 104d accordingly garbage-collects the divided heap area (S1308) While the GC unit 104d is garbage-collecting the divided heap area, the locking unit 104e suspends the execution of the application that uses the divided heap area. Once the garbage collection has finished, the object area acquiring unit 104a acquires the object area in the divided heap area again (S1306). If the acquisition is successful, the object area acquiring unit 104a renews the divided heap area information in the memory heap area management table 104f (S1309).

Thus, in the application execution apparatus 100, an object area for storing a generated object is allocated within a divided heap area which is a small area obtained by dividing the memory heap area for each application, so that the burden of a single garbage collection operation by the GC unit 104d can be reduced. Also, in the case where the VM unit 103 executes a plurality of applications, while garbage collection is being performed on one divided heap area, the locking unit 104f suspends only the execution of an application which uses the divided heap area, so that the VM unit 103 can continue to execute applications which uses other divided heap areas.

Figure 31:
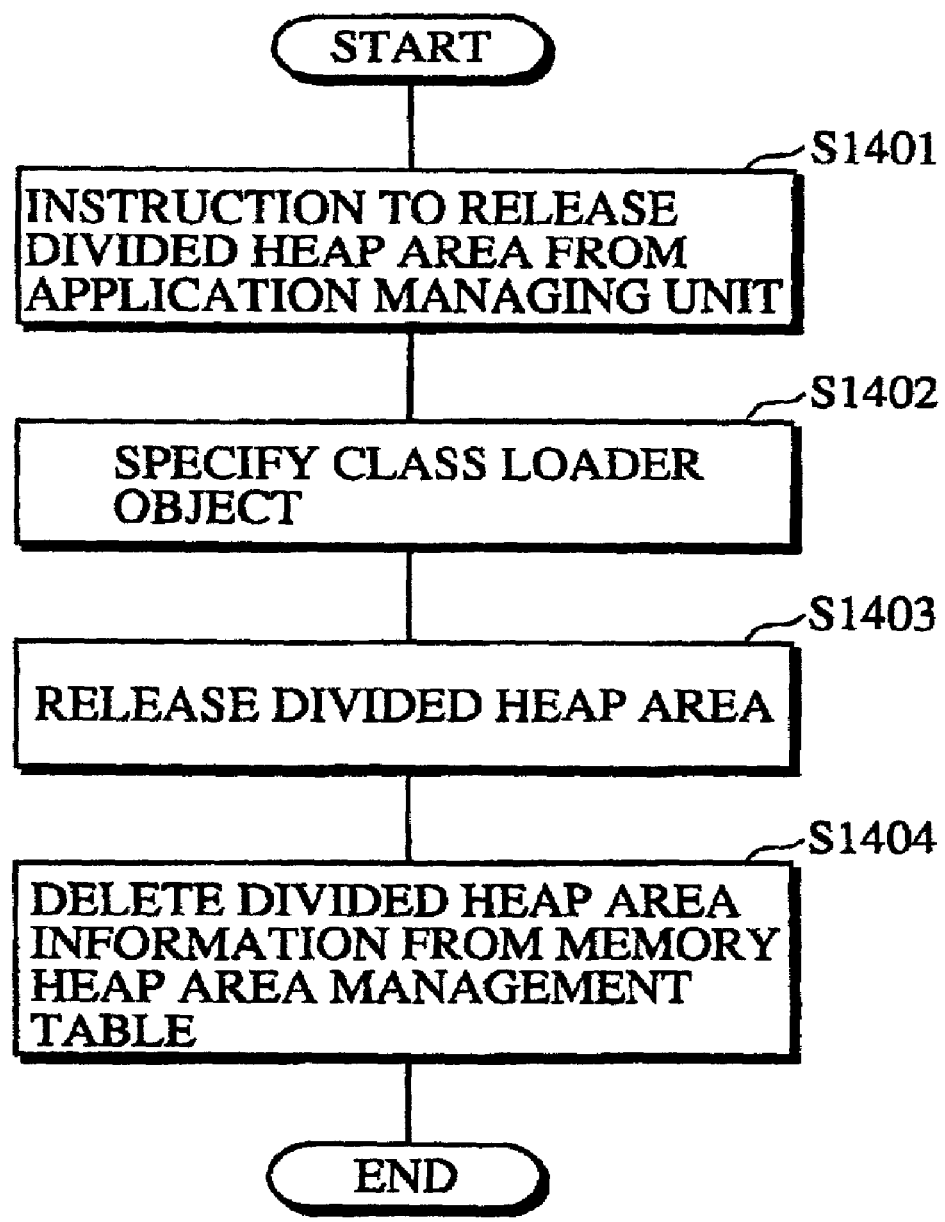
FIG. 31 is a flowchart showing an operation of releasing a divided heap area when an application is completed.

FIG. 31 is a flowchart showing a divided heap area releasing operation of the memory heap managing unit 104 when an application is completed. Upon the completion of the application, the application managing unit 102 instructs the divided heap area releasing unit 104c to release a divided heap area corresponding to a class loader object which has loaded the completed application (S1401). The divided heap area releasing unit 104c specifies the divided heap area corresponding to the class loader object in the memory heap area management table 104f (S1402), and releases the divided heap area based on divided heap area information for the divided heap area (S1403) The divided heap area releasing unit 104c then deletes the divided heap area information from the memory heap area management table 104f (S1404).

In this way, every time an application ends, the application execution apparatus 100 can release a whole divided heap area corresponding to the application in a short time.

Figure 32:
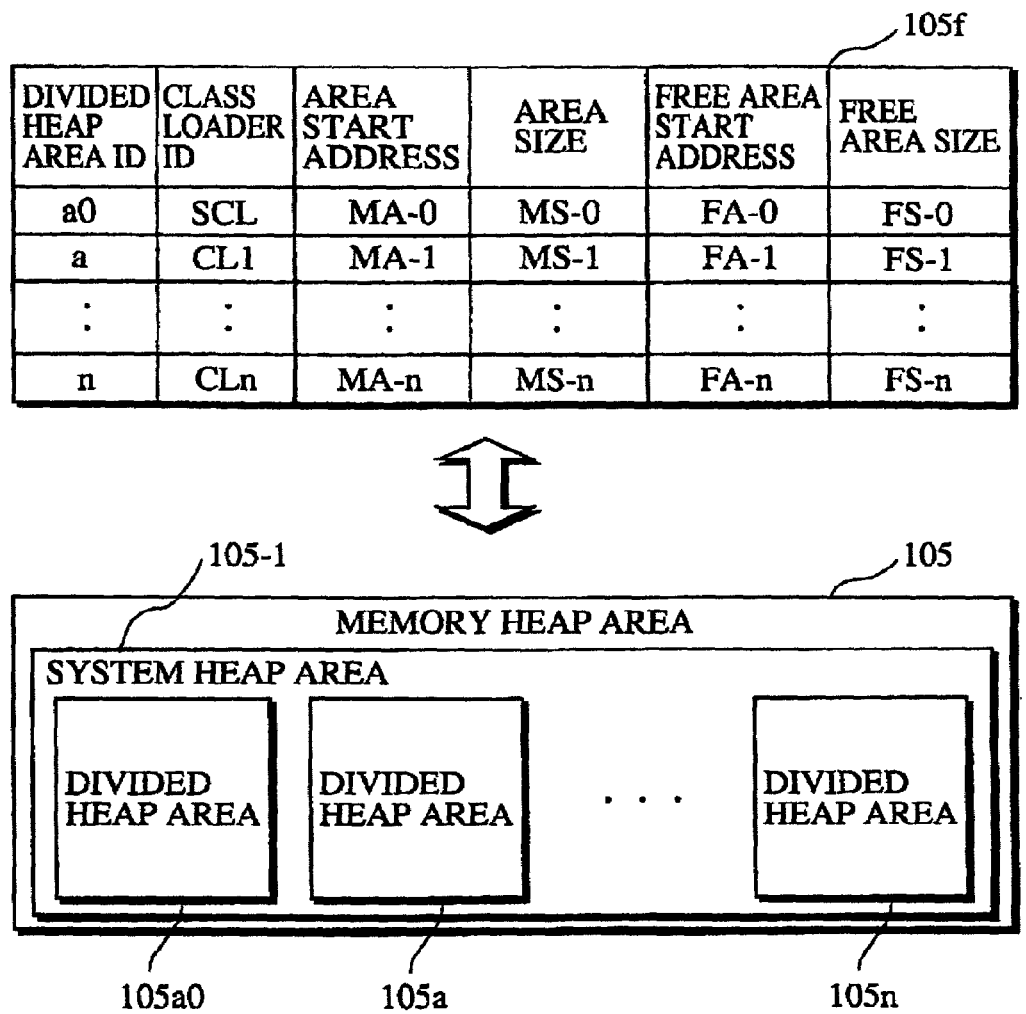
FIG. 32 shows the state where a system heap area has been registered in the memory heap area management table.

The above embodiment describes the case where the divided heap area acquiring unit 104b allocates a divided heap area for a system class loader object, without particularly distinguishing the system class loader object from other objects. However, the whole memory 105 may be allocated as a memory area for a system class loader (system heap area 105-1) as shown in FIG. 32, with the divided heap area acquiring unit 104b acquiring divided heap areas for other class loader objects within the system heap area 105-1. In this case, upon starting the system, the object area acquiring unit 104a acquires an object area for a system class loader object in the system heap area 105-1, and registers a combination of an ID of the system class loader object and information about the acquired object area (called "divided heap area 105a0" for convenience's sake) in the memory heap area management table 105f. The information registered here includes a divided heap area ID (a0), a class loader ID (SCL), an area start address (MA-0), an area size (MS-0), a free area start address (FA-0), and a free area size (FS-0) Following this, each time the divided heap area acquiring unit 104b acquires a divided heap area for a class loader object in the system heap area 105-1, the divided heap area acquiring unit 104b adds a combination of an ID of the class loader object and information about the divided heap area to the memory heap area management table 104f as shown in FIG. 32, in the same way as the above embodiment. Meanwhile, according to the flowchart of FIG. 30 the object area acquiring unit 104a acquires an object area in the divided heap area acquired by the divided heap area acquiring unit 104b (S1306), and if the acquisition is unsuccessful (S1307), instructs the GC unit 104d to perform garbage collection on the divided heap area. The GC unit 104d accordingly garbage-collects the divided heap area (S1308). When an application is completed, the application managing unit 102 instructs the divided heap area releasing unit 104c to release a divided heap area corresponding to a class loader object which loaded the application, and the divided heap area releasing unit 104c accordingly releases the divided heap area as described in FIG. 31. Here, the GC unit 104d performs garbage collection on the entire system heap area 105-1, and combines released areas in units of divided heap areas, with it being possible to efficiently use the system heap area 105-1.

Though the construction of the application execution apparatus 100 of the above embodiment is illustrated by the functional block diagram in FIG. 28, the application execution apparatus 100 is in reality realized through the use of hardware including a CPU, a memory, and an input/output device for input/output with the outside, and the execution of software. The software is designed to manage the function of each construction element shown in FIG. 28. To load the software from a CD-ROM, a CD-ROM reading interface may be employed. The memory may be an RAM, an ROM, a hard disk, or a removable medium such as a CD, an FD, and a memory card.

In the above embodiment, the number of divided heap areas allocated to each application is not limited to one, but a plurality of divided heap areas may be allocated to each application. For example, when an application itself has a class loader, a divided heap area is allocated to the class loader, too.

Also, the size of a divided heap area acquired by the divided heap area acquiring unit 104b may be varied in accordance with a program instruction to the divided heap area acquiring unit 104b.

Although the present invention has been fully described by way of examples with reference to the accompanying drawings, it is to be noted that various changes and modifications will be apparent to those skilled in the art.

Therefore, unless such changes and modifications depart from the scope of the present invention, they should be construed as being included therein.

What is claimed is:

1. An application execution apparatus including a plurality of devices, a Java middleware unit, and an OS (Operating System) unit which provides resources to applications, comprising a storing unit for storing a plurality of applications,
wherein the Java middleware unit includes:
application executing means for reading the plurality of applications in the storing unit and executing the plurality of applications;
first table holding means for holding a first table which shows a correspondence between applications, tasks corresponding to the applications, and treads which make up each task;

first table renewing means for, when a thread is generated in response to a request from an application being executed, adding a correspondence between the generated thread, the application, and a task generated for the application to the first table to thereby renew the first table; and notifying means for, upon receiving an instruction to complete the application, notifying the OS unit of a task corresponding the application, based on the first table, and the OS unit includes:

task generating means for generating the task for executing the application;

thread generating means for generating treads which make up the task generated by the task generating means;

controlling means for executing the generated threads to execute program codes of the application, providing a device to the application as a resource in accordance with a request from the application, and registering a correspondence between the provided resource and the task to which the threads belong, in a second table showing a correspondence between provided resources and tasks corresponding to generated threads in the first table; and collecting means for specifying the resource corresponding to the task notified by the notifying means based on the second table, and collecting the specified resource, wherein the Java middleware unit further includes:

requesting means for requesting to notify the application which is being executed, of a change of a status of a device;

status change notifying means for notifying the application of the change, upon detecting the change;

wherein the requesting means requests the status change notifying means to call a listener which waits to be informed of the change; and the status change notifying means makes the notification by calling the listener, upon detecting the change;

wherein the status change notifying means generates a special thread for calling the listener, and calls the listener by executing the special thread;

second table holding means for holding a table showing a correspondence between listeners, special threads, and applications; and table renewing means for referencing the table in the second table holding means when the requesting means requests the status change notifying means to call the listener, judging whether the application corresponding to the listener is shown in the table, and adding the listener to the table in correspondence with the application if the application is shown in the table, wherein the status change notifying means does not generate the special thread if the table renewing means judges that the application is shown in the table, and generates the special thread if the table renewing means judges that the application is not shown in the table.

2. The application execution apparatus of claim 1, wherein the special thread monitors whether information showing the occurrence of the change is held in a queue which transfers information between threads, and calls the listener upon detecting that the information is held in to queue.

3. The application execution apparatus of claim 1, wherein the special thread is in a wait state before information showing the occurrence of the change is held in a queue which transfers information between threads, and becomes active and calls the listener when the information is held in the queue.

* * * * *

UNITED STATES PATENT AND TRADEMARK OFFICE
CERTIFICATE OF CORRECTION

| | | |
|---|---|---|
| PATENT NO. | : 7,024,668 B2 | Page 1 of 1 |
| APPLICATION NO. | : 09/854268 | |
| DATED | : April 4, 2006 | |
| INVENTOR(S) | : Takakazu Shiomi et al. | |

It is certified that error appears in the above-identified patent and that said Letters Patent is hereby corrected as shown below:

In Claim 1, Column 26, line 66, "treads" should be "threads".
In Claim 1, Column 27, line 14, "treads" should be "threads".
In Claim 2, Column 28, line 28, "to" should be "the".

Signed and Sealed this

Fifteenth Day of August, 2006

JON W. DUDAS
*Director of the United States Patent and Trademark Office*